United States Patent [19]
Puzak

[11] Patent Number: 6,055,621
[45] Date of Patent: Apr. 25, 2000

[54] TOUCH HISTORY TABLE

[75] Inventor: Thomas Roberts Puzak, Ridgefield, Conn.

[73] Assignee: International Business Machines Corporation, Armonk, N.Y.

[21] Appl. No.: 08/599,833

[22] Filed: Feb. 12, 1996

[51] Int. Cl.$^7$ .................................................... G06F 9/38
[52] U.S. Cl. .......................... 712/207; 712/237; 712/240
[58] Field of Search ................................... 395/383, 584, 395/587; 712/207, 237, 240

[56] References Cited

U.S. PATENT DOCUMENTS

| | | |
|---|---|---|
| 4,807,110 | 2/1989 | Pomerene et al. . |
| 5,093,777 | 3/1992 | Ryan . |
| 5,214,766 | 5/1993 | Liu .......................................... 395/425 |
| 5,305,389 | 4/1994 | Palmer . |
| 5,313,634 | 5/1994 | Eickemeyer et al. ................... 395/700 |
| 5,317,702 | 5/1994 | Morisada ................................ 395/376 |
| 5,345,560 | 9/1994 | Miura et al. ............................ 395/250 |
| 5,357,618 | 10/1994 | Mirza et al. . |
| 5,361,391 | 11/1994 | Westhberg .............................. 395/425 |
| 5,377,336 | 12/1994 | Eickemeyer et al. ................... 395/376 |
| 5,507,028 | 4/1996 | Liu .......................................... 395/376 |
| 5,704,053 | 12/1997 | Santhanam ............................. 284/383 |
| 5,774,685 | 6/1998 | Dubey .................................... 395/381 |

OTHER PUBLICATIONS

"An Effective on–chip preloading scheme to reduce data access penalty", Baer etal., IEEE publication, Nov., 1991.
A. C. Klaiber et al., "An Architecture for Software–Controlled Data Prefetching", University of Washington, ACM, pp. 43–53, 1991.
A. J. Smith, "Cache Memories", University of California, ACM Computing Surveys, vol. 14, No. 3, pp. 473–530, Sep. 1982.
D. Callahan et al., "Software Prefetching", ACM, pp. 40–52, 1991.
L. B. Arimilli et al., "A Method to Allow Instruction Cache Access during a Reload Sequence", Research Disclosure, No. 342, Oct. 1992, 1 page.
P. G. Emma et al., "Early Prefetch Buffer", IBM Technical Disclosure Bulletin, vol. 34, No. 10B, Mar., 1992, pp. 63–64.
P. G. Emma et al., "New Context Bit", IBM Technical Disclosure Bulletin, vol. 30, No. 2, Jul. 1987, 1 page.
J. L Baer et al., "An Effective On–Chip Preloading Scheme To Reduce Data Access Penalty", University of Washington, ACM, pp. 176–186, 1991.

*Primary Examiner*—Zarni Maung
*Assistant Examiner*—Saleh Najjar
*Attorney, Agent, or Firm*—Ratner & Prestia

[57] ABSTRACT

A mechanism is described that predicts the success or failure of prefetching instructions based on the previous performance of the instructions. A prefetching instruction is successful if the block of information prefetched into the cache is used by the processor before it is discarded from the cache. A prefetching instruction is unsuccessful, a failure, if the block of information prefetched into the cache is not used while in the cache. The prediction regarding the success or failure of the prefetching instruction is performed utilizing a table that records the history regarding the usefulness of each prefetch made by a prefetching instruction at a given memory location. The table is called a Touch-History-Table (THT). The THT is preferably accessed during the decode phase of each instruction using the memory location of the instruction. The table records the history of previous outcomes (success or failure) of the prefetching instruction up to the table size. If a prefetch instruction is predicted as successful then a prefetch will occur and if a prefetch instruction is predicted as unsuccessful then no prefetch will be attempted.

38 Claims, 16 Drawing Sheets

| CACHE ACCESS REQUEST TYPE | PPB STATUS | PPB HIT ACTION | PPB MISS ACTION | PPB REPLACEMENT ACTION |
|---|---|---|---|---|
| INSTRUCTION FETCH | TOUCH-DATA | SEND LINE TO CACHE THT UPDATE, PREFETCH=USED PROCESS MISS | FETCH LINE TO CACHE | ✕ |
|  | FETCH-NO-DATA | THT UPDATE PREFETCH=USED PROCESS MISS |  |  |
| DATA FETCH | TOUCH-DATA | SEND LINE TO CACHE THT UPDATE, PREFETCH=USED PROCESS MISS | FETCH LINE TO CACHE | ✕ |
|  | FETCH-NO-DATA | THT UPDATE PREFETCH=USED PROCESS MISS |  |  |
| STORE DATA | TOUCH-DATA | SEND LINE TO CACHE THT UPDATE, PREFETCH=USED PROCESS MISS | FETCH LINE TO CACHE | ✕ |
|  | FETCH-NO-DATA | THT UPDATE PREFETCH=USED PROCESS MISS |  |  |
| TOUCH DATA | TOUCH-DATA | NO ACTION | PREFETCH LINE TO PPB MAKE DIRECTORY ENTRY | THT UPDATE PREFETCH =NOT-USED |
|  | FETCH-NO-DATA | THT UPDATE PREFETCH=USED PROCESS MISS |  |  |
| FETCH NO DATA | TOUCH-DATA | NO ACTION | DON'T PREFETCH MAKE DIRECTORY ENTRY | THT UPDATE PREFETCH =NOT-USED |
|  | FETCH-NO-DATA | NO ACTION |  |  |

FIG. 11

TOUCH HISTORY TABLE

BACKGROUND OF THE INVENTION

1. Field of the Invention

The present invention relates to the operation of the cache in a data processing system, and, more particularly, to the process of prefetching blocks of information into the cache before such blocks of information are normally requested by the processor.

2. Background and Prior Art

The cache is a small, high-speed buffer of memory, logically placed between the processor and memory, and is used to hold those sections of main memory that are referenced most recently. Each section or block specifies a 'line' of memory, where a line represents a fixed-size block of information transferred between the cache and memory. Typical line sizes in today's computers are 128 to 256 bytes. Caches are needed in today's processors because the speed of the processor is much faster than its memory. Any request made by the processor that is found in the cache can be satisfied quickly, usually on the next cycle. However, any request made by the processor that is not found in the cache, a cache miss, must be satisfied from the memory. This request usually takes several cycles to be satisfied. It is not uncommon for a cache miss to take 10 to 20 cycles to be satisfied from the memory in today's computers. Each cache miss delays the processor, usually, for the length of the miss.

Prefetching is a technique that is commonly used to reduce the delays to the processor caused by a cache miss. Prefetching schemes attempt to stage lines of memory into the cache before the processor would normally request them. If the prefetching scheme is successful then the line is transferred from memory into the cache sufficiently far enough ahead, in time, of its use and hides the difference in speeds between the processor and the memory.

A commonly used prefetching technique involves inserting prefetching instructions into the programs that run on a computer. For example, the paper "Software Prefetch" by Callahan et al, published in Proceedings of the Fourth International Conference on Architectural Support For Programming Languages and Operating Systems, April 1991 describes adding new instructions that perform prefetching in the instruction set. In the IBM RS/6000 and PowerPC processors, the Data-Cache-Block-Touch (dcbt) instruction, commonly called a touch-instruction, is used to prefetch blocks of memory into the cache. In addition, U.S. patent (application Ser. No. Y0995-036) to P. Dubey, commonly assigned to the assignee of the present invention and herein incorporated by reference in its entirety, describes a speculative touch instruction. These prefetching instructions can be used to prefetch both instructions and data (operands) into the cache. These prefetching instructions behave like a load instruction except no data are transferred to the processor. The cache directory is searched for the prefetch address and if a miss occurs then the data are transferred from the memory to the cache.

A compiler can insert these prefetching instructions into the program ahead of the actual use of the information in an attempt to assure that a line of memory will be in the cache when a subsequent instruction is executed. Unfortunately, it is not easy or even possible for the compiler to insert prefetching instructions to avoid cache misses in all cases. Sometimes the prefetch address is not known until the instruction that uses the data is executed. For example, consider a load instruction that references an operand indirectly. That is, a register loads a pointer saved in memory. In this case the prefetch address is not known until the pointer that identifies the data is loaded. Also, there may be little performance benefit gained from the prefetching instruction if it is placed to close to the actual use of the data. For example, placing a prefetching instruction only one instruction before the actual use of the information it fetches will have little, if any, performance benefit over not inserting the prefetching instructions at all.

In order to increase the amount of time between prefetching a block of information into the cache and its subsequent use by an instruction in the program, the compiler may attempt to move or 'percolate up' the prefetching instruction in the program. When the prefetch address is known, the compiler can easily move the prefetching instruction up the code within an instruction basic block, where an instruction basic block represents the instructions between two branches in a program. However, moving the prefetching instruction out of the original basic block to an earlier basic block does not always improve performance and can even be detrimental to performance by causing incorrect prefetches to occur. By moving the prefetching instruction from one basic block into another basic block, the compiler is, in essence, predicting the direction of the branch at each basic block boundary, either taken or not taken. If the actual execution flow of the program is different from the predicted flow used by the compiler to insert the prefetching instruction then a prefetching instruction executed in one basic block can prefetch a cache line for another basic block that is never executed. Thus a compiler must trade-off placing very accurate, but not much performance benefit, prefetching instructions close to the instructions that use the prefetched data and inaccurate, but potentially more performance benefit, prefetch instructions much further away from the instructions that use the data.

It is the subject of this invention to predict which prefetching instructions produce accurate and successful prefetch addresses and allow these instructions to be executed by the processor, and similarly, predict which prefetching instructions produce inaccurate or unsuccessful prefetch addresses and ignore these instructions at execution time where the accuracy of a prefetching instruction is used to describe whether the block of information prefetched by the prefetching instruction gets used by the processor before it is discarded from the cache. These prefetching instructions are inserted by the compiler into the programs. By improving the accuracy of each prefetching instruction, the compiler can liberally place and aggressively 'percolate up' the prefetching instructions in a program to increase the distance between the prefetching instruction and its actual use by another instruction and thus increase the performance benefit gained from the prefetch.

There are several reasons why inaccurate or unsuccessful prefetches should be avoided. First, each prefetch that is not used contaminates the cache with a useless line and wastes valuable cache space. Second, when a unsuccessful prefetch is made the replacement algorithm must choose a line currently in the cache to be overwritten by the prefetched line. If the replaced line is re-referenced before another miss occurs then an additional cache miss occurs. Third, when the prefetched line is copied into the cache then cache references from the processing elements can be blocked during the line transfer cycles. Recall, that if the cache line size is 128 bytes and the transfer bus is 8 bytes wide then there are 16 cycles needed to put the line into the cache arrays. During this period a cache request from the instruction-fetch-controls or operand-fetch-controls can be blocked because the cache arrays are unavailable. Fourth, each unsuccessful prefetch uses valuable bus cycle to transfer the line of memory from the memory into the cache. If a real cache miss occurs during this time then the bus will be busy transferring a useless prefetch and the real cache miss is delayed.

Data prefetching (or operand prefetching), as distinguished from instruction prefetching as described above, can also be performed by the programs that run on a computer. For example, the paper "Software Prefetch" by Callahan et al, published in Proceedings of the Fourth International Conference on Architectural Support For Programming Languages and Operating Systems, April 1991 describes adding new instructions in the instruction set that perform prefetching. These prefetching instructions behave like a load instruction except no data are transferred to the processor. The cache directory is searched for the prefetch address and if a miss occurs then the data are transferred from the memory to the cache. A compiler can insert these prefetching instructions into the program ahead of the load instruction in an attempt to assure that the data associated with the load instruction will be in the cache when actually needed by the processor. Unfortunately, it is not easy or even possible for the compiler to insert prefetching instructions for operands in all cases. Also, there may be little performance benefit gained from the prefetching instruction if it is placed to close to the actual use of the data. Placing the prefetching instruction before a branch instruction can cause an incorrect prefetch to occur if the action of the branch was incorrectly predicted by the compiler.

Several systems are known in the art which use a prefetching mechanism to stage lines of memory to the cache before the processor would normally use them.

The paper "An Architecture for Software-Controlled Data Prefetching" by Klaiber and Levy, published in Proceedings 18th Intl Symposium on Computer Architecture 1991, describes a compile-time method where fetch instructions are inserting into the instruction-stream based on anticipated data references. At execution time the processor executes these fetch instructions to prefetch data to the cache.

U.S. Pat. No. 4,807,110 to Pomerene et al describes a prefetching mechanism in which cache miss pairs are remembered in a table. The table is called a shadow directory and each miss pair represents a previous miss and a next miss. A prefetch is attempted only if a miss pattern is repeated. A prefetch will not be attempted unless the miss pattern is repeated.

U.S. Pat. No. 5,093,777 to Ryan describes a mechanism where previous cache misses are stored in a first-in, first-out miss stack, and the stored addresses are searched for displacement patterns. Any detected pattern is then used to predict future misses by prefetching the predicted address. This strategy only uses the previous miss address to generate a prefetch address and does not association the instruction(s) that caused the miss with the prefetch address.

U.S. Pat. No. 5,305,389 to Palmer describes a prefetching mechanism that stores the access pattern of a program in a pattern memory. Prefetch candidates are obtained by comparing a current set of objects (accesses) to the objects (assesses) saved in the pattern memory. Patterns matches need not demonstrate a complete match to the objects saved in the pattern memory to generate a prefetch candidate. Prefetches are attempted for the remaining objects of each matching pattern.

U.S. Pat. No. 5,377,336 "Improved Method To Prefetch Load Instruction Data" to Eickemeyer et al describes a mechanism that prefetches data into the cache. The prefetch mechanism scans the instruction buffer ahead of the decoder to identify the next load instruction in the instruction stream. If one is identified then a pre-decode unit computes the operand address using the current values in the registers specified by the load instruction. A data prefetch is then attempted for the operand address just computed. In addition, a history table saves the operand address of the last value loaded by the instruction and offset information from the previous address loaded by the instruction. An additional prefetch address can be obtained by adding the offset information and previous operand address. This prefetch mechanism is used to prefetch data in advance of the decoder and can only prefetch operands after the instructions have been fetched into the instruction buffers.

U.S. Pat. No. 5,357,618 to Mirza describes a mechanism that can prefetch lines that are used within program loops. The mechanism uses two new instructions to control prefetching. Prior to a program loop the compiler will insert the new instruction 'Move GPR To Stride Register' to insert a calculated stride value into a stride register. This actions enables prefetching by establishing a 'binding' between a GPR, used as an index register to address data within the loop and a Stride-Register, used to calculate prefetch addresses. At the end of the loop, the compiler inserts the second new instruction 'Clear Stride Register Set' to inhibit prefetching of data. This action terminates the prefetching process.

SUMMARY OF THE INVENTION

The object of the invention is to provide a mechanism to efficiently predict, with a high degree of accuracy, the usage of prefetched information.

Prefetching instructions, or touch instructions, belongs to the instruction set architecture of a processor and can be used to prefetch both instructions and data (operands) into a cache before such instructions and data are actually used by the processor. Typically, these prefetching instruction are inserted into a program by the compiler.

According to the present invention, a Touch History Table (THT) is utilized to record the address of each prefetching instruction inserted into a program. Associated with each entry in the THT is the address of the prefetching instruction and history information that records the success or failure (used or not-used status) of previous prefetching attempts by that instruction. The address of each decoded instruction is then compared against the entries saved in the table and if a match occurs the history information is consulted. If the instruction just decoded was a prefetching instruction and the history information indicates that it was producing useful prefetches in the past then another prefetch will be attempted. However, it the history information indicates that the previous prefetches were not used then no prefetch will be attempted.

By providing a THT of relatively small size in comparison to the cache, compilers can liberally insert prefetching instructions into programs and the probability of future cache hits is increased without increasing the cache size.

Other objects and advantages of the invention will become more fully understood upon consideration of the following detailed description presented in conjunction with the accompanying drawings.

BRIEF DESCRIPTION OF THE DRAWING

FIG. 11 is a table summarizing the actions of the Pending Prefetch Buffer Controls of FIG. 10 according to the present invention;

DETAILED DESCRIPTION OF THE PRESENT INVENTION

First, a description is set forth relative to how instructions and operands are fetched in a typical high performance processor without prefetching. Then, the structure and operations of a machine using a Touch-History-Table are given in more detail according to the present invention.

Figure 1:
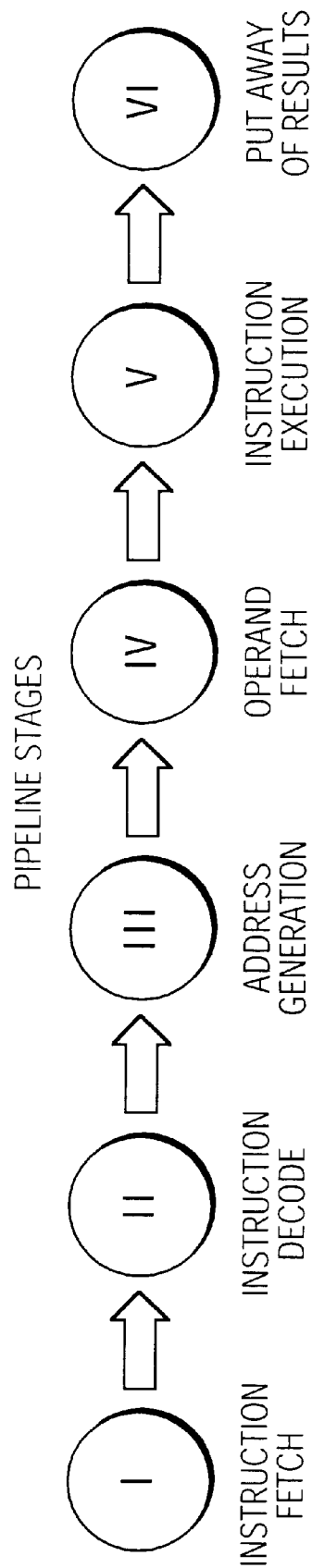
FIG. 1 is a pictorial representation of the stages of a pipelined processor.

FIG. 1 shows the major components that make up a processor's pipeline. The components are instruction fetch (stage I), instruction decode (stage II), address generation (stage III), operand fetch (stage IV), instruction execution (stage V), and put away of results (stage VI). Each instruction enters the pipeline and ideally spends one cycle at each pipeline stage. Individually, each instruction takes six cycles to pass through the pipeline. However, if the pipeline can be kept full then each component of the processor (pipeline stage) can be kept active working on a different instruction, each at a different pipeline stage, and one instruction can completed in every cycle. Unfortunately, keeping the pipeline full is not easy. Pipeline stalls frequently occur and processing elements become idle and performance is lost.

Cache misses are one of the major causes of pipeline delays. Cache misses can occur during pipeline Stage I for instructions and during Stage IV for operands. In either case, a cache miss can stall the pipeline until the instructions or data are fetched from memory and delivered to the requesting processor element. It is not uncommon for a cache miss to cost a modern processor 10 to 20 cycles.

Figure 2:
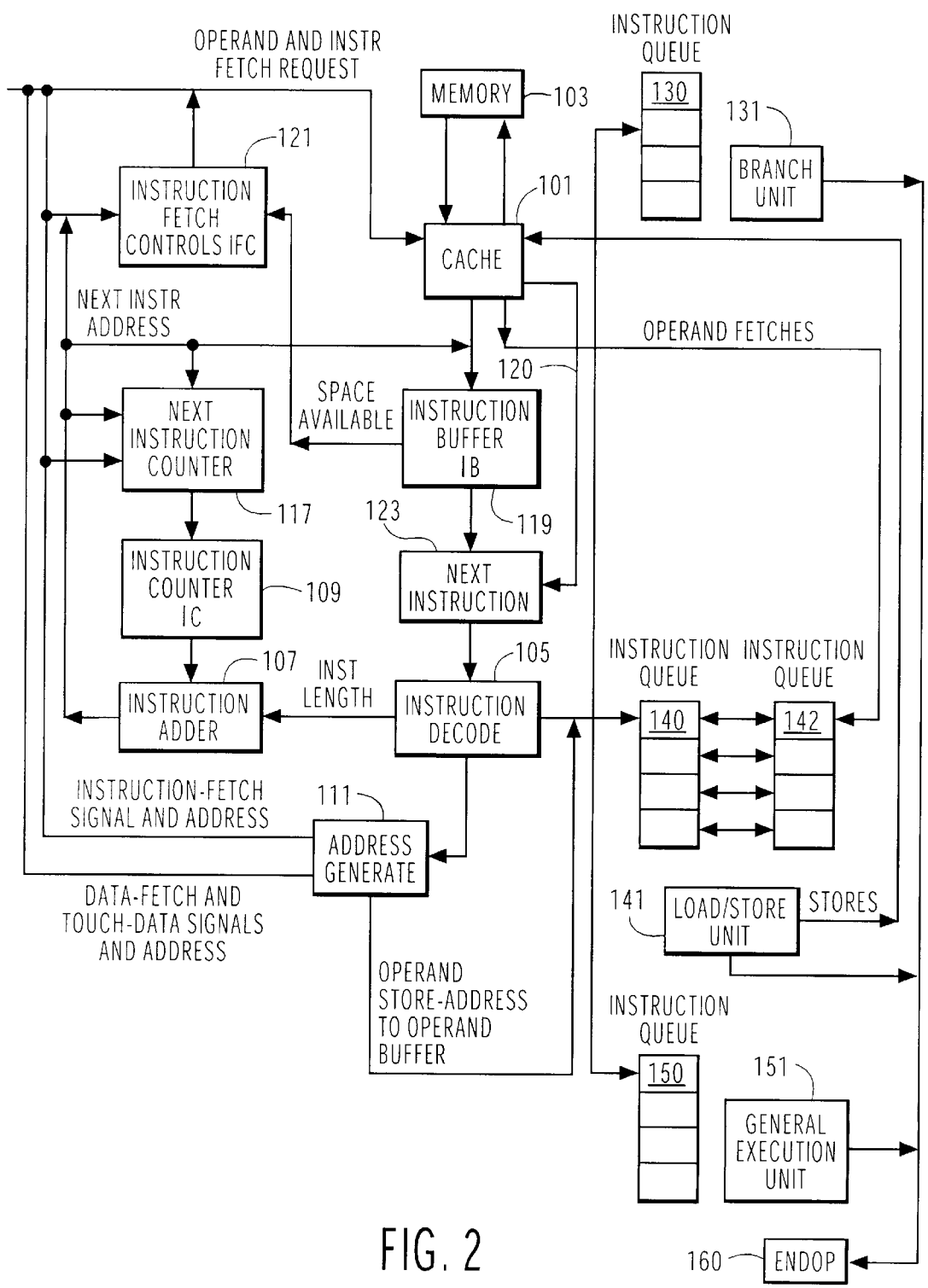
FIG. 2 is a functional block diagram of a conventional processor.

FIG. 2 illustrates the essential features of a typical high performance processor. For descriptive purposes only, FIG. 2 emphasizes the instruction and operand fetching portions of a RISC-like pipeline processor where only load and store instructions reference memory, and de-emphasizes or omits many other features necessary for a complete design.

The main memory 103 stores instructions and operands of program executing on the processor. Typically, the instructions stored in main memory 103 belong to the instruction set architecture of the processor. However, if one or more of the instructions stored in memory do not belong to the instruction set architecture of the processor, such instructions may be translated into a format belonging to the instruction set architecture of the processor. The instructions stored in the main memory 103 may include prefetching instructions, or touch instructions, which belong the instruction set architecture of the processor. Such prefetching instructions can be used to prefetch both instructions and data (operands) into a cache 101 before such instructions and data are actually used by the processor. Typically, these prefetching instruction are inserted into the instruction stream stored in the memory 103 during compilation.

Instructions and operands are fetched from main memory 103 and stored in the cache 101. Each fetch specifies a 'line' of memory, where a line represents a fixed size block of information transferred between the cache and memory. Line sizes typically range from 128 to 256 bytes. As shown, the cache 101 is a unified cache holding both instructions and operands. Alternatively, the cache 101 may be divided, one for instructions and one for operands, which is commonly called a split cache. A more detailed description of the structure of the cache 101 may be found in A. J. Smith, "Cache Memories", Computing Surveys, vol. 14, no. 3, Sept 1982, pp. 473–530, herein incorporated by reference in its entirety.

Instructions are staged from the cache 101 to an instruction buffer (IB) 119. The IB 119 typically holds the next N instructions in sequence following the one currently being decoded. Typical values for N are 8 or 16 instructions. Instructions can be fetched from the cache individually. However it is usually desirable to fetch instructions from the cache in blocks where a block is typically 8 to 16 bytes wide and the address of each block fetched is adjusted to an 8 or 16 byte boundary depending of the width of the block fetched. By retrieving several instructions per cache fetch, more cache cycles are available for operand fetching. For example, if each instruction is 4 bytes wide then four instructions are returned for each cache fetch made over a 16 byte bus.

The Instruction-Counter (IC) 109 holds the address of the instruction currently being decoded and the Instruction-Decode-Mechanism 105 holds the instruction currently being decoded. As instructions are loaded from the Next Instruction Register 123 into the instruction-decode-mechanism 105 three actions occur in parallel. First, the instruction length information (in S/390 architecture these are the left two bits of the instruction image) from the instruction-decode-mechanism 105 and the instruction-counter-address 109 are added together in the instruction-adder 107 to produce the next-sequential instruction-address. The output of the adder is then sent to the next-instruction-counter address 117, the instruction-fetch-controls (IFC) 121, and the instruction buffer 119. These actions will be discussed further below.

Second, the instruction along with instruction execution information is placed in the execution queue of the appropriate execution unit. That is, if the instruction just decoded is a branch then it is placed in a free position in the instruction queue 130 of the Branch execution Unit 131. If the instruction is a load or store then it is placed in an empty position in the instruction queue 140 of the load/store execution unit 141. Similarly, all other instructions are placed in the next free position of the instruction queue 150 of one or more general execution units 151 (one shown). Note that more than one execution unit may be used to improve the overall performance of the processor. For example, floating point instructions may be sent to a specialized floating-point execution unit, and or the processor may have individual multiply execution units, divide execution units and addition/subtraction units. For simplicity of the description, it is assumed that the instructions are executed in the order in which they are placed on their execution queue. Instructions are added to the instruction queues from the top and each execution unit takes instructions off of its execution queues from the bottom. Note, that the load/store execution unit has an operand buffer 142 associated with each position in its instruction queue 140. Each operand buffer holds the operand for the associated load instruction or the operand address for the associated store instruction in its corresponding instruction queue position. Load instructions must wait in the instruction queue until their corresponding operand is returned from the cache 101 before execution can begin.

Third, if the instruction is a load or store then operand address calculations are required. Similarly, if the instruction is a branch then the target address of the branch needs to be calculated. Each operand address and target address is generated in the address-generate-mechanism 111. In the S/390 architecture, the operand address is generated by adding the contents of a base register, an index register, and a displacement field, which are specified in the instruction image and supplied to the address-generate mechanism via the decoder 105. If the instruction just decoded was a load, then a fetch-data signal along with the address (from the address-generate-mechanism 111) is sent to the cache 101. The datum at that address is then returned from the cache to the operand-buffers 142. The operand is matched with its load instruction and placed in the operand buffer 142 at a location that corresponds to the load instruction in the instruction queue 140. Store instructions also require that an operand address be generated. This address is saved in operand buffer corresponding to the store instruction and used by the load/store execution unit to address the memory location updated after the store is executed. It is noted that some architectures generated a store-pretest before each store is made. For these architectures a request is sent to the cache, similar to a load request, to verify that program owns the memory address that is to be modified.

If the instruction is a branch then the target address of the branch must be calculated. When the address calculation is complete, the address-generate mechanism 111 forwards the target address along with a instruction-fetch signal to the cache. The instructions contained within the instruction fetch block are then returned to the instruction buffer 119.

If the instruction is a prefetching instruction, then the prefetch operation encoded by the prefetch instruction must be performed. Conventionally, instruction decode logic 105 detects that the instruction being decoded is a prefetching instruction and generates a touch-data-signal. The touch-data-signal along with an address are sent to the cache 101. The address may be encoded in the prefetching instruction itself, and thus be generated by the instruction decode logic 105. In the alternative, the address may require calculation. Again, these calculations may be performed in the address-generate mechanism 111. The touch-data-signal will cause the cache to search its directory to determine if the block of memory identified by the address is present in the cache. If the block of memory is not in the cache (i.e., a miss), then the block of information is transferred from the memory to the cache. If the block of memory identified by the prefetching instruction is in the cache (i.e., a hit), no further action is needed. Regardless of the block of information being found in the cache, a hit or miss, no data is transferred from the cache back to the processor for the instruction's execution.

It is noted that it may be necessary to send the prefetching or touch instructions to an execution unit for completion. These instruction are in essence no-ops after the address-calculations are complete and no other actions are required. However, to allow instructions to complete in order it may be necessary to send the prefetching instruction to either the load/store unit 141 or general-instruction-unit 151. Recall, these instructions have a format similar to a load instruction only no data is transferred between the cache and the processor and no registers are changed.

Finally, an Endop function 160 marks the completion of the instruction where all results from the instruction are known throughout the machine and operand buffers and instruction queue positions can be marked available.

Return now to the output from the address adder 107. If the instruction just decoded is not a branch then the address represents the next-sequential instruction-address and is sent to the instruction-fetch-controls 121, next-instruction-counter 117 and instruction buffer 119. The instruction-fetch-controls keeps the instruction-buffer full with the next N instructions in sequence following the one currently being decoded. The instruction buffer holds these N instructions and provides them quickly to the next-instruction decode register 123. Typically, the output from the address adder 107 identifies the next-instruction address and is used to select the instruction from the instruction buffer that is loaded into the next-instruction register 123. When the decode mechanism 105 is ready it is loaded from the next-instruction register 123. In parallel, the address from the next instruction-counter register 117 becomes the current instruction-counter register 109 value representing the address of the next instruction being decoded. The above mentioned sequence of events is then repeated for the next instruction.

As instructions are loaded from the IB 119 to the next-instruction register 123, space becomes available for new instructions in the IB. The IB signals the instruction-fetch controls 121 to send another IB entry via the 'IB space available' signal. When this signal is raised the IFC 121 requests from the cache 101 the next sequential instruction fetch beyond the last one requested. As mentioned above, the instructions are usually fetched in blocks and the instruction-fetch controls must remember the address of the last block of instructions fetched. When the 'IB space available' signal is raised the instruction-fetch controls generates the address of the next-sequential block and sends an instruction-fetch signal and address to the cache. For example, if the address of the last block of instructions fetched was 100 and a 16 byte wide fetch block is used then the address of the next block fetched is 116.

Return again to the output from the address adder 107. Assume that the instruction just decoded is a branch and the branch is taken, e.g., an unconditional branch. In this case the address formed by the address-generate mechanism 111 is the target address for the branch. The branch address, along with a instruction-fetch signal, is sent to the cache 101, the instruction-fetch controls 121, and the next IC register 117.

The cache returns the instructions identified by the target address to the instruction buffer 119 and to the next instruction register 123 via path 120. The IFC 121 needs the target address to update the last instruction fetch address and the next IC register 117 needs the address to identify the next instruction held in the next-instruction register 123.

If the instruction just decoded is a conditional branch then a taken/not taken guess must be made and it is a common practice to provide two next-instruction and two next-instruction-counter registers so that both paths of the branch can be ready for selection when the outcome of the branch is known. Typically, branch prediction controls direct the IFC to pursue instruction fetching down either the guessed taken path or the guessed not taken path of the branch. If the branch was guessed taken then the instruction-fetch-controls will start fetching instructions similar to those fetched when an unconditional branch was decoded. Similarly, if the branch was guessed not taken then the instruction-fetch-controls will proceed to fetch instructions down the not-taken-path as described when a non-branch instruction was decoded.

Branch prediction errors can be detected at various stages in the pipeline. For example, as soon as the condition code of the branch is known then every conditional branch can be predicted with certainty and the branch becomes, in essence, an unconditional branch. This can occur at various stages during the branch's execution. However, after execution of each conditional branch the branch's action, either taken or not taken, is compared to the branch guess, taken or not taken, and prediction errors can be detected. If a prediction error has occurred, then the appropriate next-instruction register and next instruction-count register are selected and the pipeline is restarted. Any instructions fetched down the incorrect path which are in the instruction buffer may be discarded, depending on the buffer management rules.

As mentioned above, all load instructions must wait at the load/store execution unit 141 until the needed data is available from the cache 101. If the data is in the cache then it can be delivered to the appropriate operand buffer 142 on the next cycle. This will allow the instructions to proceed through the pipeline on the desired cycle-by-cycle schedule. However, if the operand is not in the cache then a 'cache miss' has occurred and execution of the load instruction will be delayed.

It is the purpose of this invention to determine which prefetching instructions are producing useful and accurate prefetching addresses and continue to allow the processor to execute these instructions and ignore those prefetching instructions that produce prefetches that are not used by the processor. This will avoid transferring blocks of memory unnecessarily into the cache via a prefetch and wasting valuable cache space and bus cycles. As described above, prefetching instructions, or touch instructions, belong to the instruction set architecture of the processor and can be used to prefetch both instructions and data (operands) into the cache before such instructions and data are actually used by the processor. Typically, these prefetching instruction are inserted into a program by the compiler.

According to the present invention, a table is provided that records the address of the most recently executed prefetching instructions and history information that indicates whether the prefetches generated by these instructions were used or not used. The table is referred to as a Touch-History-Table (THT). The description below embodies the present invention in a RISC architecture processor where only load and store instructions reference memory; however, the present invention is not limited in this respect and may be embodied in non-RISC architecture processors without loss of effectiveness or generality. Also, the description below uses the IBM RS/6000 Data-Cache-Block-Touch instruction as an example of a prefetching instruction and uses the terms 'prefetching-instruction' and 'touch-instruction' interchangeably.

The table (THT) is preferably accessed in parallel with the instruction's decode phase. If the instruction being decoded is a touch-instruction and its address matches an address held in the THT then it can be determined, in advance of the address-generate phase, whether the instruction is producing useful prefetches. At the conclusion of the decode phase each touch-instruction must proceed to the address-generate-mechanism for operand address calculations. If it is determined that the touch-instruction is producing useful prefetches then a touch-data-signal will be sent to the cache by the address-generate-mechanism to initiate a prefetch. If it is determined that the touch-instruction is producing unused prefetches then the instruction will proceed to the address-generate-mechanism as before, however, no prefetch will occur. The address-generate mechanism will send a fetch-no-data-signal to the cache along with the prefetch address (operand address) calculated by the address-generate-mechanism. Ideally, this will avoid wasting any processor resources caused by unused prefetches and only allow useful prefetches to occur.

Figure 3:
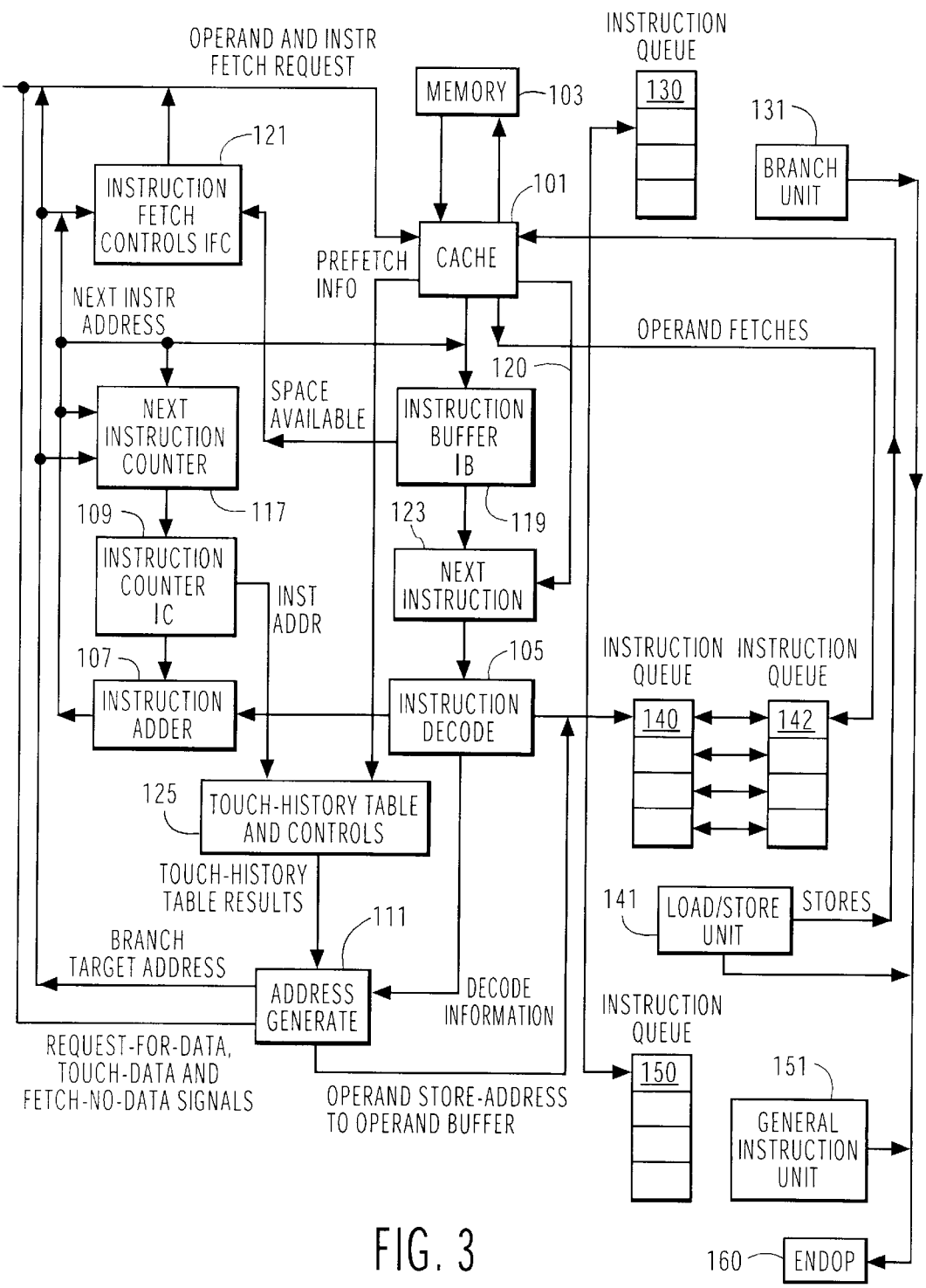
FIG. 3 is a functional block diagram of a processor including prefetch prediction controls according to the present invention.

FIG. 3 extends the processor description shown in FIG. 2 and adds a Touch-History-Table-Controls (THT-Controls) function 125. The Touch-history-Table-Controls 125 receives inputs from two components of the processor, the instruction counter 109 and the Cache 101, and supplies the address-generate mechanism with history information regarding the accuracy (used or unused status) of recent prefetches made by touch-instructions. The instruction-counter 109 supplies the THT-Controls with the address of the instruction being decoded by the decode-mechanism 105. This address will be used to access the THT, contained within the THT-controls, to obtain history information regarding recent prefetches in the event the instruction currently being decoded is a touch instruction. The cache 101 returns prefetching information regarding the status of recent prefetches initiated by the THT-controls. This information will be used to update the THT and records which touch-instructions are producing useful prefetches and which instructions produce unused prefetches.

Figure 4:
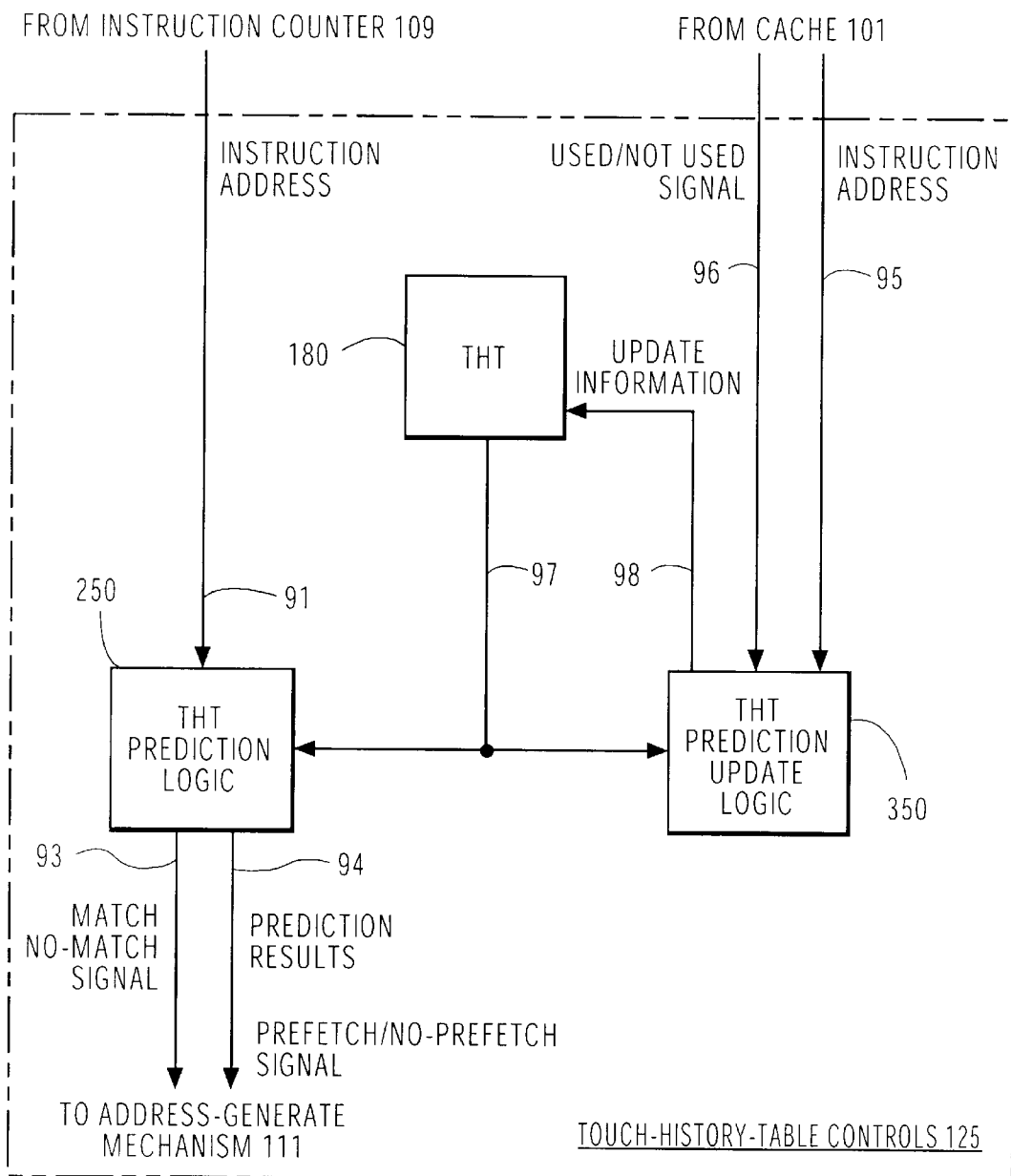
FIG. 4 is a functional block diagram of the Prefetch Prediction Controls shown in FIG. 3 including Touch History Table (THT), THT Prediction Logic and THT Prediction Update Logic according to the present invention.

FIG. 4 shows a general overview of the operations of the THT-controls 125 with a more detailed description following. The THT-control logic includes the THT 180, the THT-prediction logic 250, and the THT-prediction-update logic 350. As mentioned above, the THT 180 includes entries that identify previously executed touch-instructions and corresponding history information that records the success (usefulness) and failure (uselessness) of previous prefetches made by these instructions. The THT-prediction logic 250 compares the address of the instruction being decoded to the entries in the THT. The address of the decoding instruction is sent from the instruction-counter register 109 to the THT-prediction logic via path 91. The THT sends instruction and history information to the THT-prediction logic and the THT-prediction-update logic via path 97. The THT prediction logic compares the address of the instruction being decoded to the addresses held in the THT. If a match exists, the corresponding history information is examined and a prediction is made regarding the usefulness of the pending prefetch. A match/no-match signal and the prediction results are then sent to the address-generate-mechanism 111. A match signal is sent via path 93 and the prediction results via path 94. If a match is not found between the address of the decoding instruction and the entries in the THT then just a no-match signal is sent via path 93. The THT-prediction-update logic 350 updates the THT when results become available from the cache regarding previously attempted prefetches. The cache 101 sends the THT-prediction-update logic the address of the instruction that caused the prefetch via path 95 and a signal denoting if the prefetch was used or not used via path 96. The THT sends instruction and history information to the THT-prediction-update logic via path 97 and the updated results are returned to the THT via path 98.

Figure 5:
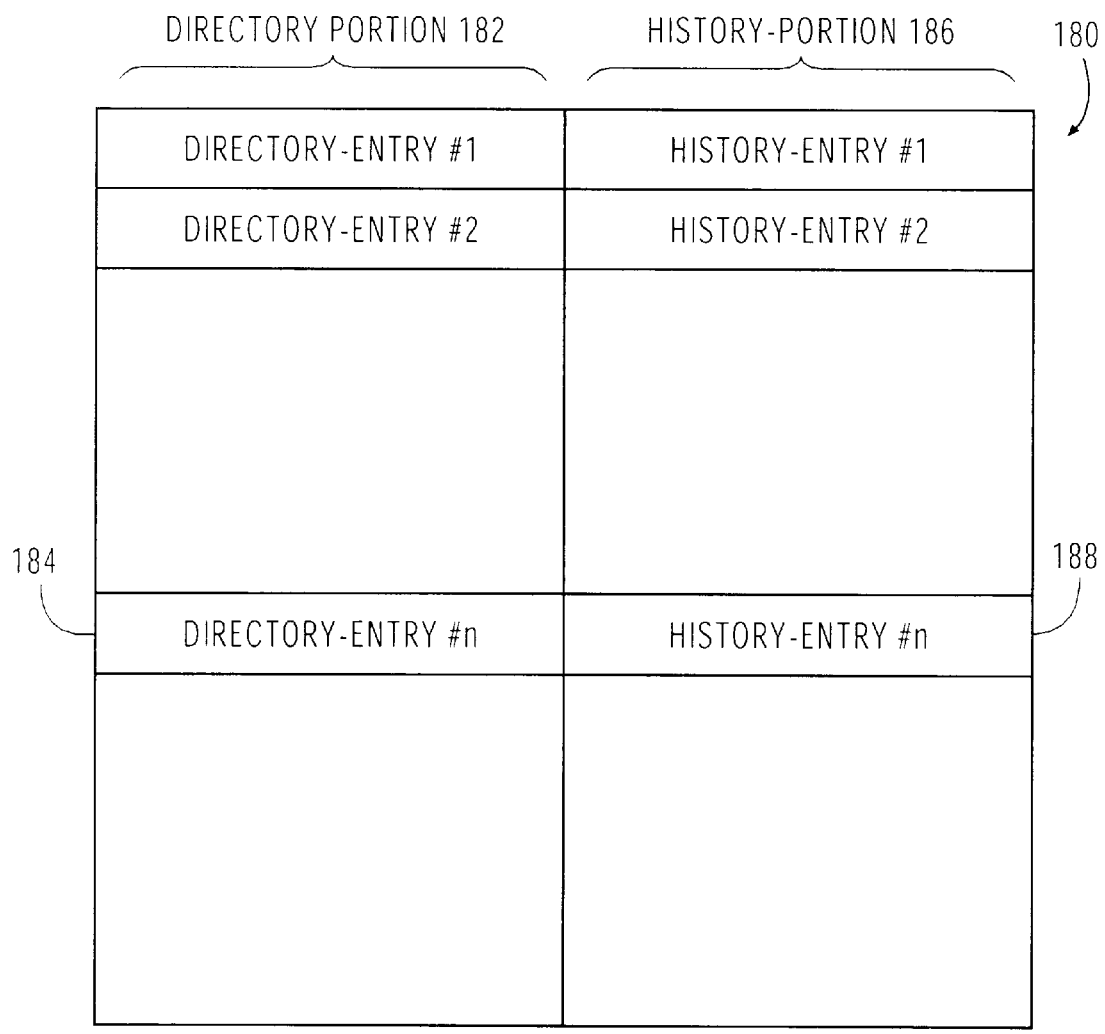
FIG. 5 illustrates the structure of the Touch History Table (THT) of FIG. 4 according to the present invention.

FIG. 5 gives a more detailed description of the THT 180 contained within the THT-controls. The THT 180 is arranged as an array of entries having a directory portion 182 and a history portion 186. A directory-entry 184 of the THT identifies, by address, a touch-instruction executed by the processor. Each directory entry will be used as a match field to compare against the address of the instruction being decoded. It is noted that the address saved in the directory entry can be abbreviated or truncated. It is possible to save only a subset of the bits that make up the full instruction address in each THT directory entry. In this case the same subset of bits will be selected from the address of the decoding instruction and used in any comparison test.

A history-entry 188 of the THT records the outcome (used or unused) of the last N prefetches associated with the touch-instruction identified by the directory-entry field, where N represents the size of the history field for each entry. The amount of history to maintain is an implementation decision and does not effect the operation of the invention offered herein. The simplest strategy is to keep a single bit of history information, where a one '1' indicates that the last prefetch initiated by the touch-instruction identified by the corresponding directory entry 184 was used and a value of zero '0' indicates that the prefetch was not used. More history information can be kept by remembering the results (used or unused) of the last N prefetches. For example, to remember the results from the last three prefetches, a three bit wide history field is needed in the THT. A three bit history would then designate bit position one as the most recent prefetch history bit, bit two as the next most recent prefetch results, and bit three as the oldest history bit. As the results of new prefetches become known, history bits one and two would be shifted into bit positions two and three respectively, and the results of the most recent prefetch would be placed in bit position one.

Figure 6:
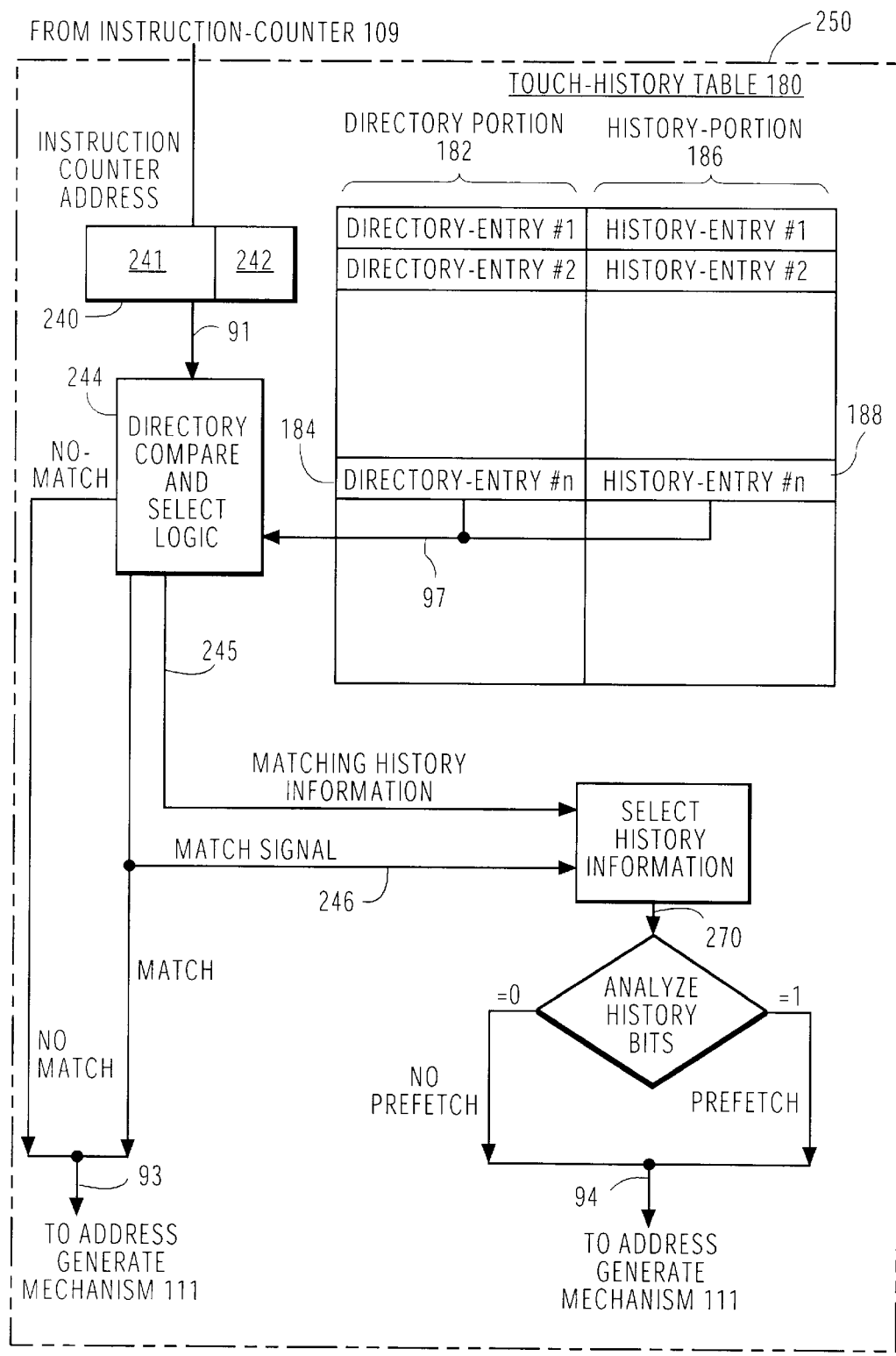
FIG. 6 is a functional block diagram of the THT Prediction Logic of FIG. 4 according to the present invention.

FIG. 6 shows in more detail the structure and operations of the THT-Prediction Logic 250 shown in FIG. 4. The figure shows the instruction-counter address 240 supplied by the instruction-counter mechanism 109. Recall, this address represents the address of the instruction being decoded in the instruction-decode mechanism 105. Directory-compare-and-select Logic 244 compares the entries in the directory portion of the THT 182 to the instruction counter address 240 to determine if a match exists. If a match is not found then a 'no-match' signal is sent to the address-generate mechanism 111 via path 93. If a match is found then a 'match' signal is sent to the address-generate-mechanism 111 via path 93 and to the select-history-information logic 260 via path 246. The history information corresponding to the matching entry found in the THT is sent to the select-history-information logic 260 using path 245. Typically, it is a common practice for directory-compare-and-select logic 244 to divide the instruction address 240 into a high order portion address 241 and a low order portion 242 in order to compare it to the addresses held in the THT directory. The high order portion of the address 241 typically identifies a row and tag address used to match the entries saved in the THT while the low order portion 242 identifies address of the instruction down to the word address or byte address. For example, if the THT directory contains 256 rows, then 8 bits from the high order portion of the address (2**8=256) are used to select the row to search in the THT directory. A more detailed description of the comparison logic 244 may be found in IBM Systems Journal "Structural aspects of the System/360 Model 85, General organization and the Cache" Volume seven, No 1, 1968, pp 2–21, herein incorporated by reference in its entirety and in "Cache Memories", Computing Surveys, vol 14, no. 3, September 1982, by A. J. Smith, included earlier.

The select-history-information logic 260 and analyze-history-bits logic 270 will examine the history information of the matching THT entry and predict the success or failure (used/not-used) of the pending prefetch for the decoded touch-instruction. The history field information can be one to a multiple of bits wide (one shown). If the history field of the THT is one bit wide then a bit value of '1' indicates that the instruction was producing useful prefetches and a 'prefetch' signal is sent to the address-generate-mechanism 111 via path 94. If the history bit is '0', indicating that the last prefetch was unused, then a 'no-prefetch' signal is sent to the address-generate-mechanism 111 via path 94.

If the history-portion of the THT is more than one bit wide then logic exists to determine a majority count of the history bits. For example, if the history field is three bits wide then the select logic would send a 'prefetch' signal if two or more of the bits are a '1' and a 'no-prefetch' signal if two or more have a '0' value. If there is no majority count of the history bits, i.e., four history bits with two having a value of '1' and two having a value of '0', then the select logic can be biased to recommend either a 'prefetch' or 'no-prefetch' signal to the address-generate-mechanism. The appropriate decision is an implementation issue and does not effect the overall operations of the system.

Figure 7:
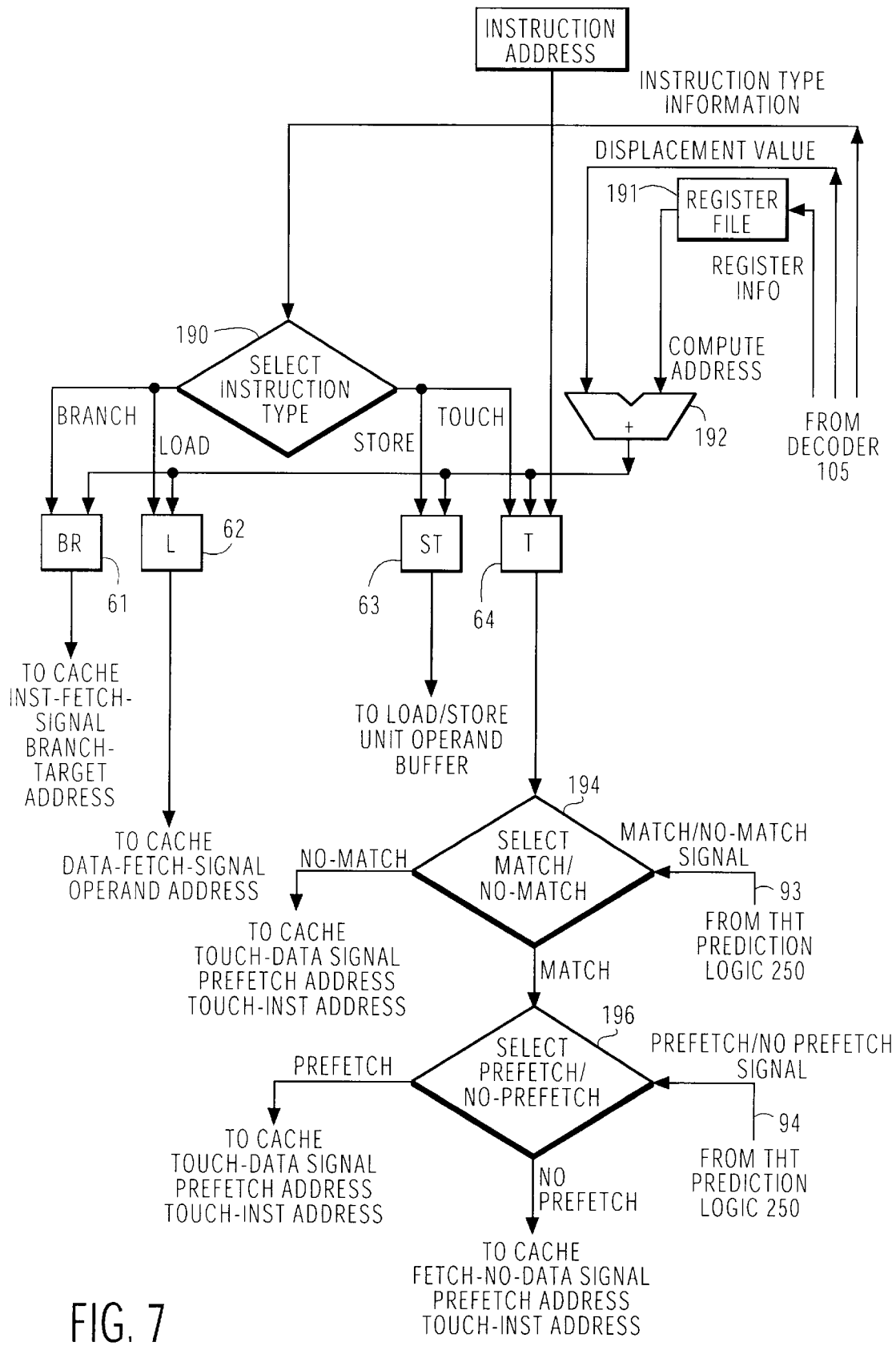
FIG. 7 is a functional block diagram of the Address Generate Mechanism of FIG. 3. according to the present invention.

FIG. 7 illustrates in more detail the logic of the address-generate mechanism 111. Recall, the address-generate mechanism 111 generates the address required for all branches, loads, stores, and touch (prefetch) instructions. The decoder 105 supplies the address-generate mechanism with instruction type information (load, branch, store, or touch), and information to generate the address. The address may be supplied by the decoder 105, or may be calculated by the address-generate mechanism 111. It should be noted that there are many methods used to compute the required addresses. The one presented here is chosen for simplicity and uses only a base register and displacement; however, other operand address generation methods may be used and do not effect the operation of the invention offered. The base register used in the address calculation signals register-file 191 to supply the contents of the register to the operand-address adder 192. Here it is added to the displacement value sent from the decoder 105. The output of the adder, which is the address, is then sent to the following four gates, 61, 62, 63, and 64. Preferably, in parallel to the address calculations, the instruction type information is sent to the instruction-type-selector 190. Depending on the instruction type, one of four actions can occur.

If the instruction-type is a branch then gate 61 is enabled and allows the branch-target address to proceed to the cache along with a instruction-fetch-signal. If the instruction-type is a load then gate 62 is enabled and allows the operand-address to proceed to the cache along with a data-fetch-signal. If the instruction-type is a store then gate 63 is enabled and allows the operand-address to proceed to the load/store unit and be saved in the appropriate operand-buffer corresponding to the store instruction. If the instruction-type is a touch-instruction then gate 64 is enabled and the information supplied by the THT-prediction logic is examined before the operand address can proceed to the cache. Recall, the THT-prediction logic supplies the address-generate mechanism a match/no-match signal the indicates if the address of the decoding instruction matched the address of a touch instructions held in the THT via path 93 and the prediction results, a prefetch/no-prefetch signal, via path 94.

First, the match/no-match signal from the THT-prediction logic 250 is examined using select logic 194. Select logic 194 examines this signal, and if a no-match condition is detected then the operand-address (a prefetch address) and the instruction address (touch-instruction address) proceed to the cache along with a touch-data-signal. It is noted that this is an implementation decision because the initial execution of a touch instruction will miss all of the entries in the THT and cause a no-match signal to be sent to select logic 194. By sending a touch-data-signal to the cache, the system is biased towards prefetching, even when there is no previous history about the success or accuracy of a touch-instruction. If select logic 194 detected a match condition then the prefetch/no-prefetch signal sent from the THT-prediction logic 250 is examined using select logic 196. If a no-prefetch condition is detected then the prefetch address and touch-instruction address are sent to the cache along with a fetch-no-data-signal. If a prefetch signal is detected by select logic 196 then the prefetch address and touch-instruction address proceed to the cache along with a touch-data-signal.

The structure and operations of the cache 101 are now described. The description of the cache 101 and prefetching process is presented in three parts. First, the normal operations of the cache 101 without prefetching are presented. Second, the cache 101 is modified to include prefetch buffers that allow for prefetching. Finally, the operations of the cache 101 and prefetching update logic are described.

Figure 8:
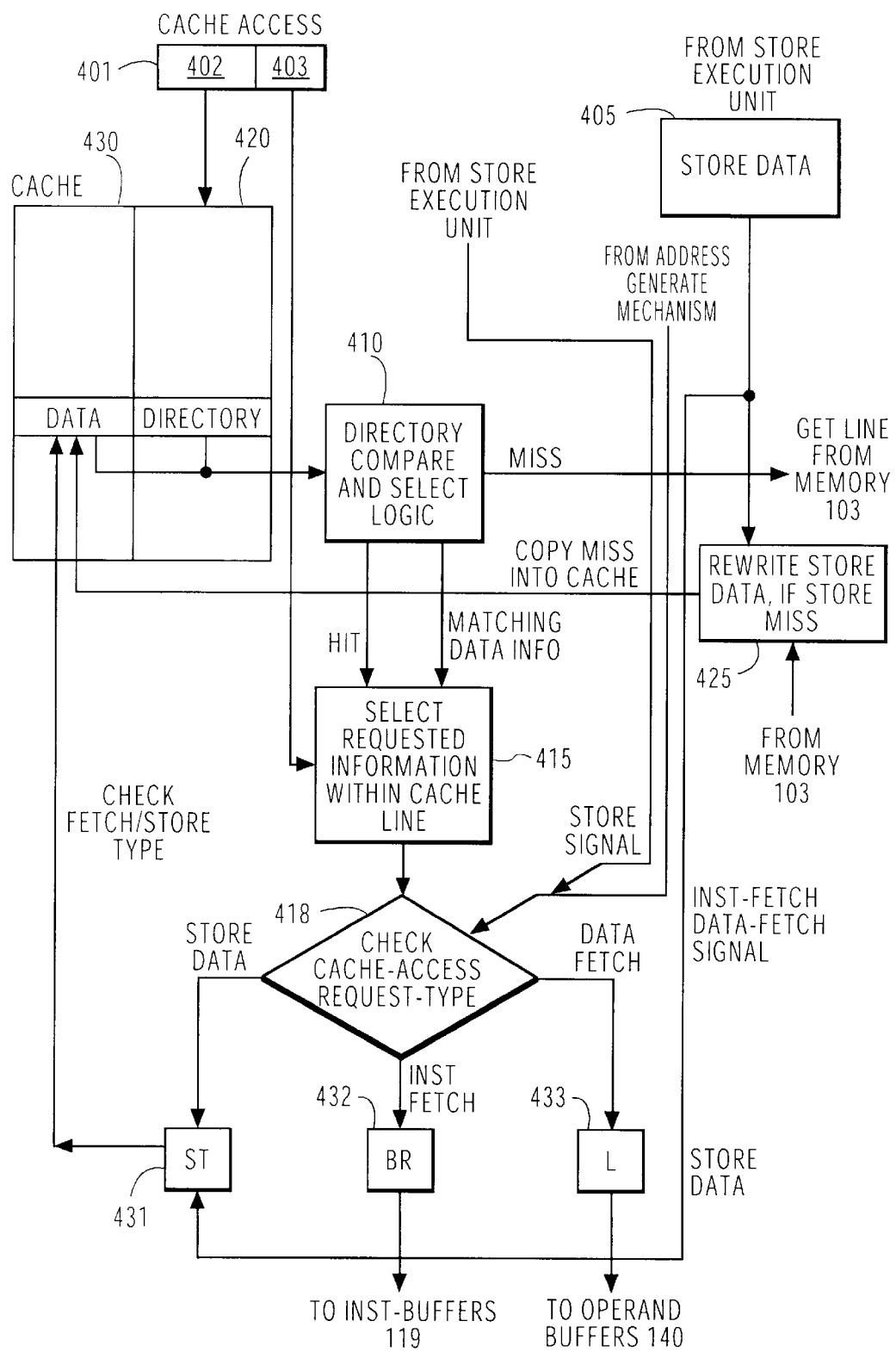
FIG. 8 is a functional block diagram of the Cache of FIG. 3 according to the present invention.

FIG. 8 illustrates the operations of a cache 101 processing a normal request. Each cache request presents to the cache 101 an address 401. As shown, the cache is preferably divided into entries each having two portions, a directory portion 420 and a data portion 430. The address of the cache request 401 is also divided into two parts, a high order portion 402 and low order portion 403. The high order portion 402 identifies the line of data specified by the address that is transferred between the memory 103 and the cache 101 whenever a cache miss occurs. The low order portion 403 identifies the byte (or word) within the line. For example, if a line size of 128 bytes is used in the design of the cache 101, then the low order portion of the address would be 7 bits long, 2**7=128.

For each address presented to the cache 101, the high order portion 402 is compared against the line addresses held in the cache directory 420. The directory portion 420 of each entry identifies the line of memory held in the corresponding data portion 430 of the entry. As is conventional in the art, note that an address typically represents a virtual address and that a translation is needed to a real address. Also note that the cache directory and data portion are arranged in sets and that the high order portion of the address can be additionally divided into a set identifier and line identifier.

More specifically, the high order portion 402 is supplied to directory-compare-and-select logic 410 that interfaces to the cache to determine if the high portion 402 matches the directory portion 420 of the entries of the cache. If a match occurs, then select logic 415 is activated. Select logic 415 must identify the byte (or word) within the line and forwards it to the requesting processor unit. Select logic 415 utilizes the low order portion of the address 403 to select the requested bytes (or words) within the selected line saved in the data portion 430 of the cache 101. This information is then forwarded to the requesting processing element using select logic 418. Select logic 418 examines the cache-access-request type signals sent from the address-generate-mechanism and the load/store execution unit.

There are three possible values for the cache-access-request type instructions-fetch, data-fetch and store-data. If select logic 418 detects a data-fetch signal then the request is the result of a load instruction and gate 433 is enabled and the requested information is forwarded to the requesting operand buffer in the load/store execution unit. If an instruction-fetch signal was detected then gate 432 is enabled and the requested information is sent the instruction-buffer 119. If select-logic 418 detects a store-data signal then the cache access was the result of a store instruction (from the load/store execution unit) and gate 431 is activated and the store datum 405 is rewritten back to the data portion of the cache 430.

If the directory-compare-and-select logic 410 detects that the high order portion 402 does not match the directory portion 420 of any entry, then a cache miss has occurred. In this case, the miss address is sent to memory 103, and an entire line, which is identified by the miss address, is sent back to the cache. When a cache miss is detected, a replacement algorithm exists to select a line that is currently in the cache to be overwritten by the miss when it returns from memory 103. The directory portion of the cache 420 is then be updated with the address of the new line (the miss), and when the line arrives at the cache, the information is written into the data portion 430 of the selected entry. If the miss is the result of a store request, logic 425 will replace the portion of the line that returns from memory with the store datum 405 that caused the miss. Typically, several cycles are required to transfer a line from the memory 103 to the cache 101. Conventionally, the missing line is divided into packets, wherein each packet is as wide as the transfer bus between the cache 103 and memory 101. For example, if the bus between the memory 103 and the cache 101 is 8 bytes wide and a 128 byte line size is used, then 16 cycles are required to transfer the entire line between the memory 103 and the cache 101.

To aid prefetching, a prefetch buffer may be added to the cache 101. A prefetch buffer holds those lines of memory that were transferred from the memory 103 to the cache 101 as the result of a prefetch request, and not as the result of a normal cache miss. Note, when a cache design provides for prefetching, two types of misses may occur prefetch misses and demand (or normal) misses. A prefetch miss is a prefetch request that causes a cache miss. In this instance, the line returned from memory 103 is sent to the prefetch buffer and will be transferred to the cache when it is used by the processor. On the other hand, a normal miss (or demand miss) is a cache miss that was not a cache prefetch. In this instance, the line of memory that is returned after the miss is sent directly to the cache and is not written into the prefetch buffers. The demand miss is the result of a normal instruction fetch request generated by the IFC logic 121, the operand requests from the address-generate mechanism 111, and stores sent to the cache 101 from the load/store execution unit 141.

Prefetch buffers are well known in the art. For example, IBM Technical Disclosure Bulletin articles "A Method to Allow Instruction Cache Access During a Reload Sequence", October 1992, No. 342; "Early Prefetch Buffer", Vol. 34 No. 10b March 1992 pp. 63-64; "New Context Bit", July 1987 pp. 510 describe miss or prefetch buffers in which a line of memory is transferred into a buffer before it is loaded into the cache, all incorporated herein by reference in their entirety. There are several reasons why lines returned from memory 103, as a results of a prefetch miss, should be sent to a prefetch buffer, and not loaded directly into the cache 101 as with a normal miss.

First, prefetches are a guess or prediction that a line will be used by the processor. If prefetched data is copied directly into the cache 101, then the cache's replacement algorithm may discard a line already in the cache 101. If the prefetched data is unused while in the cache, then it has been contaminated with useless lines, thus wasting valuable cache space. The prefetch buffer acts as a filter for all prefetches and only allows the prefetched data that is used by the processor to be placed into the cache. Typically a small number of buffers are needed to avoid unused lines from entering the cache.

Second, if the prefetched line is copied into the cache 101, then the replacement algorithm must choose a line currently in the cache to be overwritten by the prefetched line. If the replaced line is re-referenced before the prefetched line is referenced, then an additional cache miss occurs. That is, the line just discarded from the cache must be re-accessed from the memory 103 before the cache request can be satisfied.

Third, if the prefetched line is copied into the cache, then cache references may be blocked during the line transfer cycles. Recall, that if the cache line size is 128 bytes and the transfer bus is 8 bytes wide, then 16 cycles are required to transfer the line from the memory 103 into the cache 101. During this period a cache request from the instruction fetch controls or operand fetch controls may be blocked because the cache arrays are unavailable.

Fourth, the prefetch buffers can be implemented in the same technology as the cache and placed near the cache. Thus, an access that is found in the prefetch buffer can be satisfied in approximately the same amount of time as a cache hit.

Figure 9:
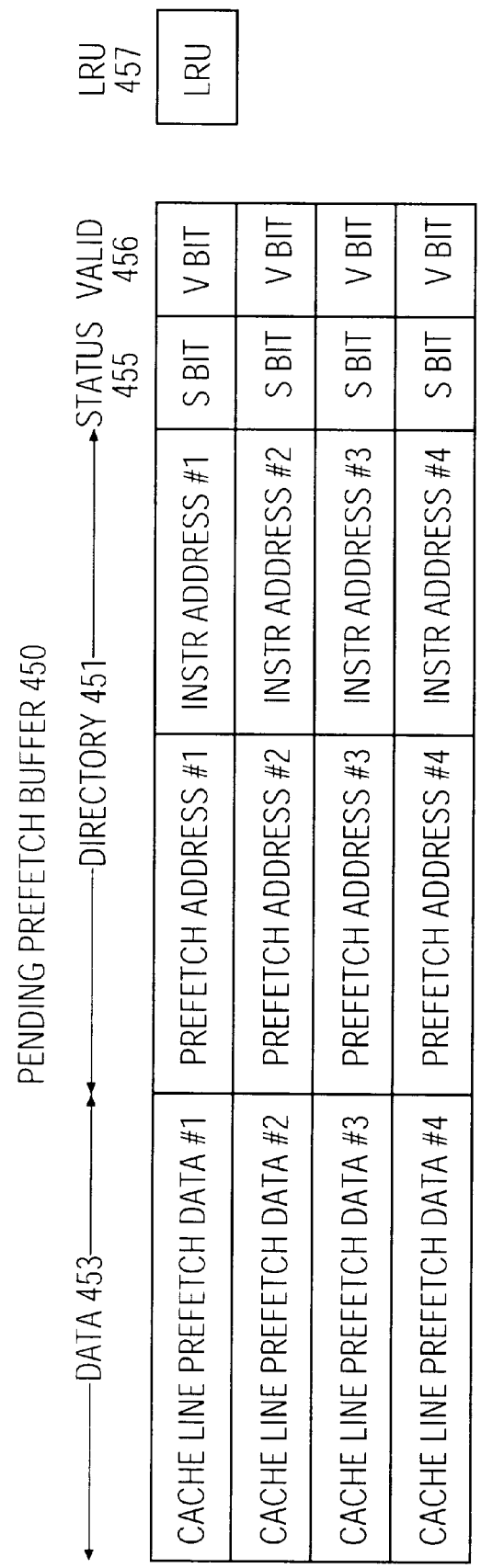
FIG. 9 is a table illustration the structure of a Pending Prefetch Buffer (PPB) according to the present invention.
Figure 10:
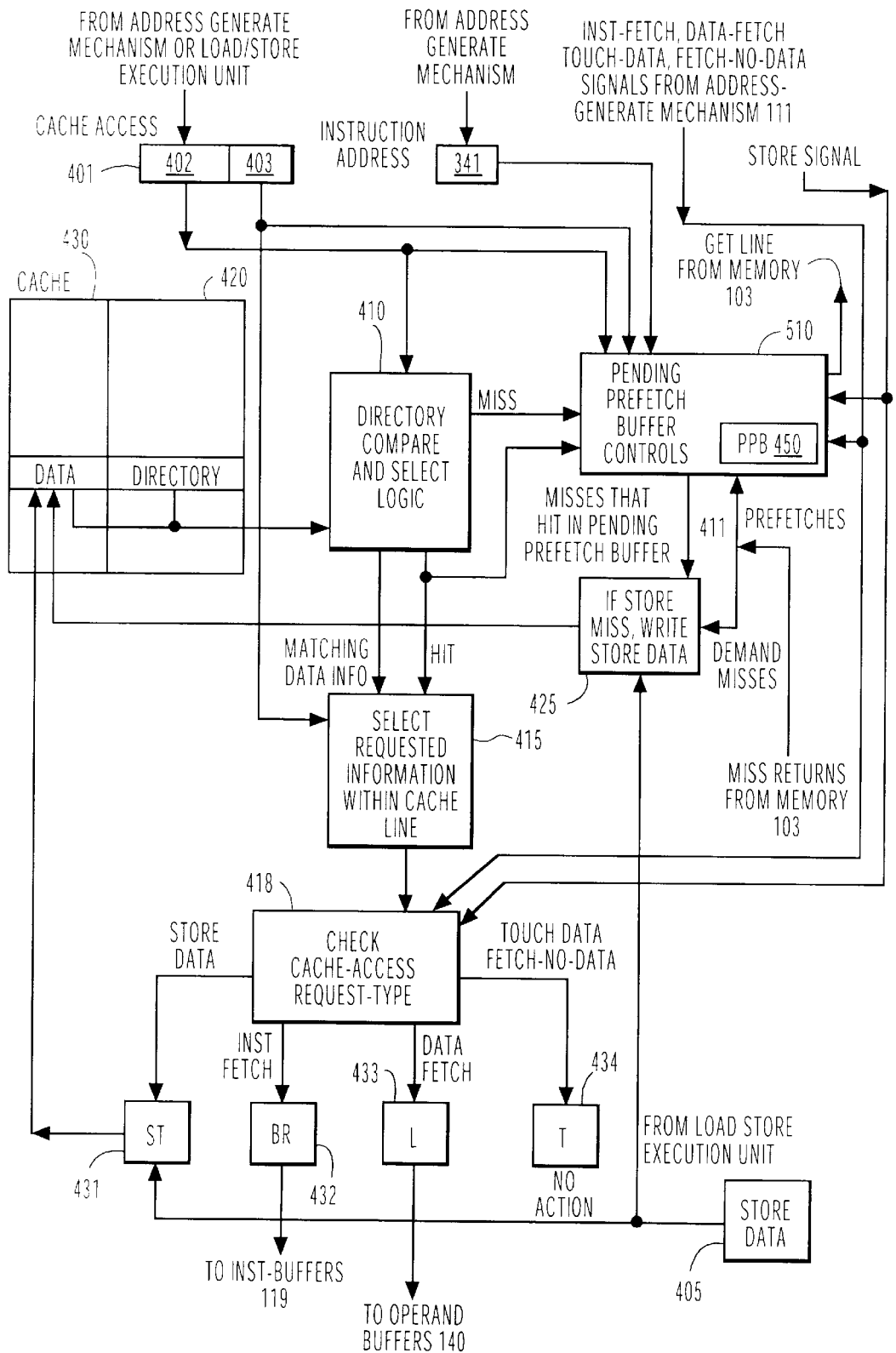
FIG. 10 is a functional block diagram of the cache of FIG. 3 in processing a fetch request, wherein the cache included a Pending Prefetch Buffer and Controls.

FIGS. 9 and 10 and the accompanying description below illustrates the structure and operation of the cache 101 including a pending prefetch buffer (PPB) 450. The PPB temporarily stores the lines of memory that are prefetched to the cache 101. FIG. 9 shows the PPB 450 includes, for example, four entries each including a directory field 451 and an data field 453. The directory field 451 contains two addresses: the address of the prefetched line and the address of the touch-instruction that caused the prefetch. The data portion of the PPB 453 stores the line of the memory 103 prefetched into the PPB 450. For example, if the memory line size is 128 bytes, then the data field 453 of each entry preferably holds 128 bytes of information.

Each entry also includes a status field 455 and a valid bit 456, as shown. The status field 455 records the value of the cache-access-request type signal that caused the prefetch, either a touch-data signal or a fetch-no-data signal. By convention, a value of 1 indicates a touch-data signal and a 0 indicates a fetch-no-data signal. The valid bit 456 indicates which entries in the PPB contain valid information. By convention, a value of 1 indicates that directory entry contains valid information and a 0 indicates that the information is invalid. A prefetch request accompanied with a touch-data signal will cause a prefetch to occur. The prefetch address and touch-instruction address will then be saved in the directory portion of the PPB. The status field 455 will be updated to reflected a touch-data event and the valid bit 456 will be set to one, indicating a valid entry. When the prefetched line returns from the memory it will be placed in the data-portion of the PPB corresponding to the directory entries that identify that line.

If a prefetch request is accompanied with a fetch-no-data signal then no prefetch will occur. However, the directory portion of the PPB will be updated to record the prefetch address and touch instruction address. The status field of the PPB will be updated to reflect a fetch-no-data condition and the valid bit will be set to one. Importantly, the status field 455 is used to update the history-field information of the THT when it is discovered that a prefetch is used or not used by the processor.

The PPB 450 may also include an LRU field 457 that records the age of each line stored in data field 453 of the entries of the PPB 450. The LRU field 457 is used to select a line for replacement when a new prefetch is attempted and all entries in the PPB 450 are currently occupied. Preferably, the LRU field 457 identifies the entry holding the least-recently-used line, which is therefore the best candidate for replacement. Note, there is only a single LRU field for the PPB 450. Moreover, the LRU field 457 can be eliminated if the PPB holds only a single entry. In this case, each new prefetch will overwrite the existing prefetch currently held in the PPB 450.

FIG. 10 illustrates the operation of the cache 101 which includes a pending prefetch buffer 450 responding to a cache request. Each cache request 401 is again divided into two parts, a high order potion 402 and a low order portion 403. The high order portion 402 identifies the line of data specified by the cache address 401 and the low order portion 403 identifies the byte (or word) within the line.

The high order portion 402 is simultaneously supplied to directory-compare-and-select logic 410 and the pending-prefetch-buffer controls 510. Directory-compare-and-select logic 410 compares the cache request to the entries in the cache directory to determine if a match exists. The pending-prefetch-buffer controls 510 compares the cache request to the entries saved in the PPB to determine if the request can be satisfied from the PPB. The actions of the pending-prefetch-buffer controls will be discussed below. If directory-compare-and-select logic 410 determines that a match exists between the cache access and the entries held in the cache directory 420 then a cache hit has occurred. A hit signal is sent to the pending-prefetch-buffer controls 510 and select logic 415 is activated. Select logic 415 identifies the byte (or word) within the line. This information is forwarded to the requesting processing element using select logic 418. Select logic 418 examines the cache-access-request type sent from the address-generate-mechanism and the load/store execution unit. Now there are five different request signals that can accompany a cache access:

Instruction-fetch, from the address-generate mechanism and instruction-fetch-controls Data-fetch, from the address-generate mechanism Store-data, from the load/store execution unit Touch-data, from the address-generate mechanism Fetch-no-data, from the address-generate mechanism If the cache-access-request type logic 418 detects a data-fetch signal then the request is the result of a load instruction. Gate 433 is enabled and the requested information is forwarded to the requesting operand buffer in the load/store execution unit. If a instruction-fetch signal was detected then gate 432 is activated and the requested information is sent the instruction-buffer 119. If select-logic 418 detects a store-data signal then the cache access was the result of a store instruction (from the load/store execution unit). Gate 431 is enabled and the store datum 405 is rewritten back to the data portion of the cache 430. If the cache access represents a prefetch request (from a touch-instruction) then the accompanying request signal is either a touch-data or fetch-no-data signal. Regardless of the prefetch signal, no action is necessary. The prefetch request is in the cache and a prefetch is unnecessary.

If the directory-compare-and-select logic 410 detects that the high order portion 402 of the cache access does not match any entry in the directory portion 420 of the cache, a cache miss has occurred. The pending-prefetch-buffer controls 510 are then signaled and logic exists within the pending-prefetch-buffer controls to determine if the cache access can be satisfied from the pending-prefetch-buffers.

A brief description of the operations of the pending-prefetch-buffer controls is now given, with a more detailed description following. Essentially, the pending-prefetch-controls will use the results of the initial search of the cache's directory (from directory-compare-and-select logic 410) to determine its actions. If the cache request was found in the cache then no action is needed by the pending-prefetch-controls. However, if the cache request misses the cache then the pending-prefetch-buffer controls determines if the line was already prefetched and can satisfied from the pending-prefetch-buffers 450. The pending-prefetch-buffer controls are sent the following information the cache access address, instruction address, cache-access-request type (instruction-fetch, data-fetch, store-data, touch-data and fetch-no-data signal) and lines of memory that are prefetched due to touch-instructions. If the cache miss (from directory-compare-and-select logic 410) was the results of an instruction-fetch, data-fetch, or store-data request and the line is in the prefetch buffers then the line is transferred from the prefetch buffers into the cache. By finding the line in the prefetch buffers, the miss is returned to the cache much faster than satisfying the miss from the memory. If the cache miss was the results of a touch-data or fetch-no-data request type and the line is found in the PPB, generally no action is required.

If the cache miss is not found in the pending-prefetch-buffers then the miss is sent to the memory. Cache misses that were the result of a instruction-fetch, data-fetch or store-data signal will bypass the pending prefetch buffer controls when they return from the memory and are sent directly to the cache. If the cache miss was caused by a prefetch request, a touch-data signal, then the line will be routed to the pending-prefetch-buffers when it returns from the memory. If the cache miss was accompanied with a fetch-no-data signal the line will not be requested from the memory. The pending prefetch buffer controls will only record that a prefetch was attempted but the THT controls predicted that the prefetch would not be used. Finally, if the cache miss was the results of a store-data request then control logic 425 exists to replace the portion of the line that returns from memory with the store information that caused the miss and the results are saved in the data portion of the cache.

The structure and operation of the pending-prefetch-buffer controls 510 are now described. FIG. 11 shows a table that summarizes the events and actions of the pending prefetch buffer controls that describe the current invention. The table relates the actions taken by the pending-prefetch-buffer controls for cache request that match (hit) a PPB entry, miss all PPB entries, and replacement algorithm actions for lines in the PPB that are overwritten due to new entries being made in the PPB. The table has five columns. The first column describes the five different cache-access-request types that can accompany a cache request instruction-fetch, data-fetch, store-data, touch-data, and fetch-no-data. The second column, PPB status, lists the value associated with the PPB status field 455 of a PPB entry that matches (hits) the current cache access. The third column, PPB hit action, lists the actions taken by the pending-prefetch-buffer controls when a cache access is found to match an entry currently held in the PPB according to the five different cache-access-request types. For example, (from the top row) if an instruction-fetch request matches (hits) a PPB entry and the corresponding value of the PPB status field 455 of the matching entry is 'touch-data' then the pending-prefetch-buffer controls will send the line from the data portion of the matching PPB entry to the cache and signal the THT-prediction-update logic 350 of FIG. 4 that the prefetch was used. However, if an instruction-fetch request matches a PPB entry and the corresponding value of the PPB status field is 'fetch-no-datal' then the miss must be satisfied from the memory. The line was not prefetched into the PPB because of the fetch-no-data signal. However the THT-prediction-update logic 350 is still notified that the prefetch, had it been made, would have been used. By notifying the PPB-prediction-update-logic that the prefetch would have been used, it is possible for future predictions made by the THT-prediction logic to recommend that a prefetch occur. The fourth column, PPB miss action, lists the actions taken by the pending-prefetch-buffer controls when a cache access does not match (a miss) any entry help in the PPB. For example, if the cache access is from an instruction-fetch, data-fetch, or store-data request and the access misses (does not match) all of the entries in the PPB then the line is fetched to the cache. If the cache access is a touch-data request and misses the entries in the PPB then a prefetch is initiated and the line is fetched from the memory to the PPB. A directory entry is made in the PPB indicating the prefetched line address and instruction address that generated the prefetch. The PPB status field is set to 1 indicating a touch-data value. Finally, if the cache access is the result of a fetch-no-data request and misses the entries in the PPB then no prefetch is attempted. A directory entry is made in the PPB recording the prefetch address and touch instruction address and the PPB status field is set to 0 indicating a 'fetch-no-datal' value. The fifth column lists, PPB replacement action, lists the actions taken by the replacement algorithm when a PPB entry is overwritten due to a prefetch or 'fetch-no-entry' directory entry.

Figure 12:
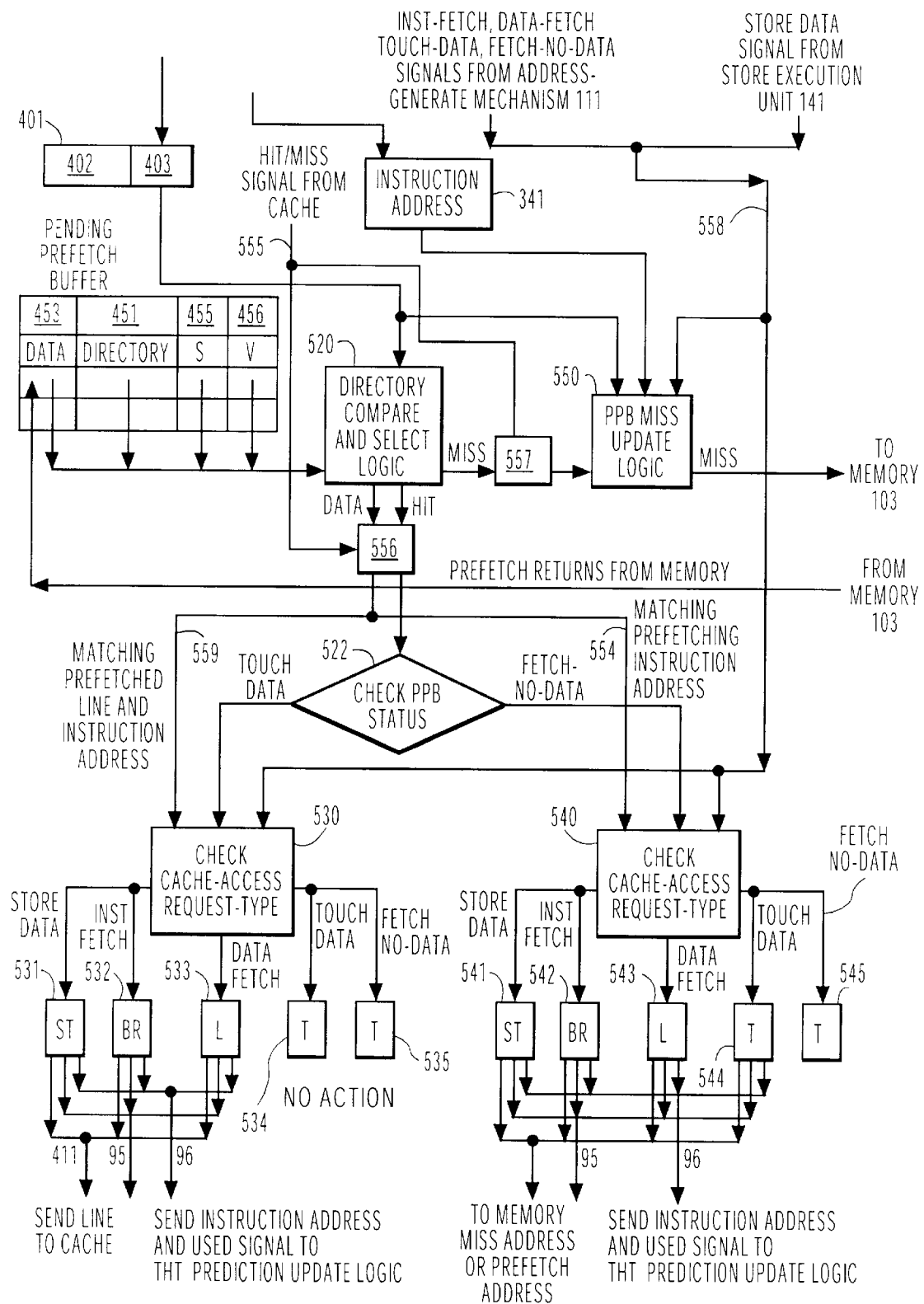
FIG. 12 is a functional block diagram of the Pending Prefetch Buffer Controls of FIG. 10 including Pending Prefetch Buffer Miss Update Logic according to the present invention.

FIG. 12 shows the actions of the pending-prefetch-buffer controls. Essentially, the pending-prefetch-buffer controls embodies the function that was listed in FIG. 11. The figure shows the cache access address 401 may be divided into a high order portion 402 and low order portion 403, as before. The high order portion 402 is sent to directory-compare-and-select logic 520 where it is compared against the prefetch-line addresses held in the directory portion 451 of the PPB. Only directory entries that have their valid bit set to 1° participate in the directory search. Directory entries with their valid bit set to '0' are ignored. If a match is detected then a 'hit' signal is sent to gate 556 and if no-match is detected then a 'miss' signal is sent to gate 557. Only one of the two gates will be enabled, (556 or 557), depending on the results of the cache directory search. Recall, the cache access address 401 was simultaneously compared against the entries help in the cache and the PPB and the results of the directory search of the cache, from directory-compare-and-select logic 410 of FIG. 10, are supplied to gates 556 and 557 of the pending-prefetch-buffer controls via path 555. If a cache hit signal is supplied on path 555 then no further actions are required and gates 556 and 557 are disabled. In this case, the cache access was found in the cache and the results from searching the directory in the PPB are not needed. If a cache miss signal is supplied on path 555 then gate 556 will be enabled if a match was detected by directory-compare logic 520. However, gate 557 will be enabled if no-match was detected by directory-compare logic 520.

If gate 556 is enabled, then the cache access 401 missed the lines in the cache and was found (hit) in one of the lines held in the PPB. The discussion that follows embodies the 'PPB hit action' associated with FIG. 11. When this occurs compare logic 522 is enabled and the PPB status field 455 of the corresponding matching entry of the PPB is examined. There are only two possible values represented in column two of FIG. 11: touch-data and fetch-no-data. If the value saved in the PPB status field represents a 'touch-data' condition then the line was prefetched and compare logic 530 is enabled where the cache-access request type is examined. Five different cache access types are possible instruction-fetch, data-fetch, store-data, touch-data, and fetch-no-data. These values are supplied to compare logic 530 via path 558. If the cache-access-request type is a store-data, instruction-fetch or data-fetch then either gate 531, 532, or 533 are enabled, depending on the request type, and a successful prefetch has occurred. That is, a prefetch was made and the results were used by the processor. When this occurs three actions occur in parallel.

First, the prefetched line is transferred from the PPB to the cache via path 411. Second, the THT-prediction-update logic is signaled that the prefetch was used and is sent the touch-instruction address of the matching entry via path 95 and a used signal via path 96. Third, the valid bit 456 of the matching PPB directory entry is marked invalid. By changing the valid bit to invalid the corresponding directory entry for the matching entry will not participate in future PPB directory searches until a new entry is made.

Directory-compare-and-select logic 520 will forward the line found in the matching entry of the data portion 453 of the PPB to compare logic 530 via path 559 where gates 531, 532, or 533 allow the line to be transferred to the data portion of the cache. If the cache-access-request type is a touch-data or fetch-no-data then no action is necessary. In this case, the line is prefetched but still not used. It is noted that a cache-access-request type of 'touch-data' that matches a line already prefetched into the PPB is just 'reprefetching' a line already prefetched. However, a cache-access-request type of 'fetch-no-data' that matches a line already help in the PPB with a PPB status field value of touch-data indicates that conflicting predictions are being made by the THT-prediction logic (prefetch the line and do not prefetch the line). When this occurs, simulation analysis has shown that since the line is already in the PPB, discarding it would be wasteful and no action is taken.

If compare logic 522 detects that the value saved in the PPB status field 455 of the matching entry in the PPB represent a 'fetch-no-data' condition then a cache access has matched a prefetch-line address held in the directory portion of the PPB however no prefetch has occurred. Recall, PPB directory entries having a PPB status value of 'fetch-no-datal' occurs when a touch-instruction was executed but the THT-prediction logic predicted that the data identified by the prefetch address would not be used. In this case a PPB directory entry was made but the line was not prefetched. Compare logic 540 is enabled where the cache-access-request type is examined. If the cache-access-request type is a store-data, instruction-fetch, or data-fetch then a cache miss has occurred and either gate 541, 542, or 543 are enabled, depending on the cache-request type. The cache line is fetched from the memory 103 and the THT-prediction-update logic is signaled to indicate that the prefetch (had it been attempted) was used. The address of the touch-instruction is sent via path 95 and a used signal is sent via path 96. The address of the touch-instruction was sent to compare logic 540 via path 554 from directory-compare-and-select logic 520.

If the cache-access-request type is fetch-no-data no action needs to occur.

If the cache-access-request type is touch-data then gate 544 is enabled and a prefetch will occur and the THT-prediction-update logic is signaled to indicated that the line was prefetched. This condition occurs when the THT prediction logic predicted that a prefetch from a previously executed touch-instruction would not be used and now the THT-prediction logic indicates that a prefetch for the same line will be used. The THT-prediction-update logic is notified that a prefetch was attempted for a line that was previously predicted "don't prefetch". By updating the THT-prediction logic that the line was prefetched an attempt is made to prefect the line at a earlier point in time.

Figure 13:
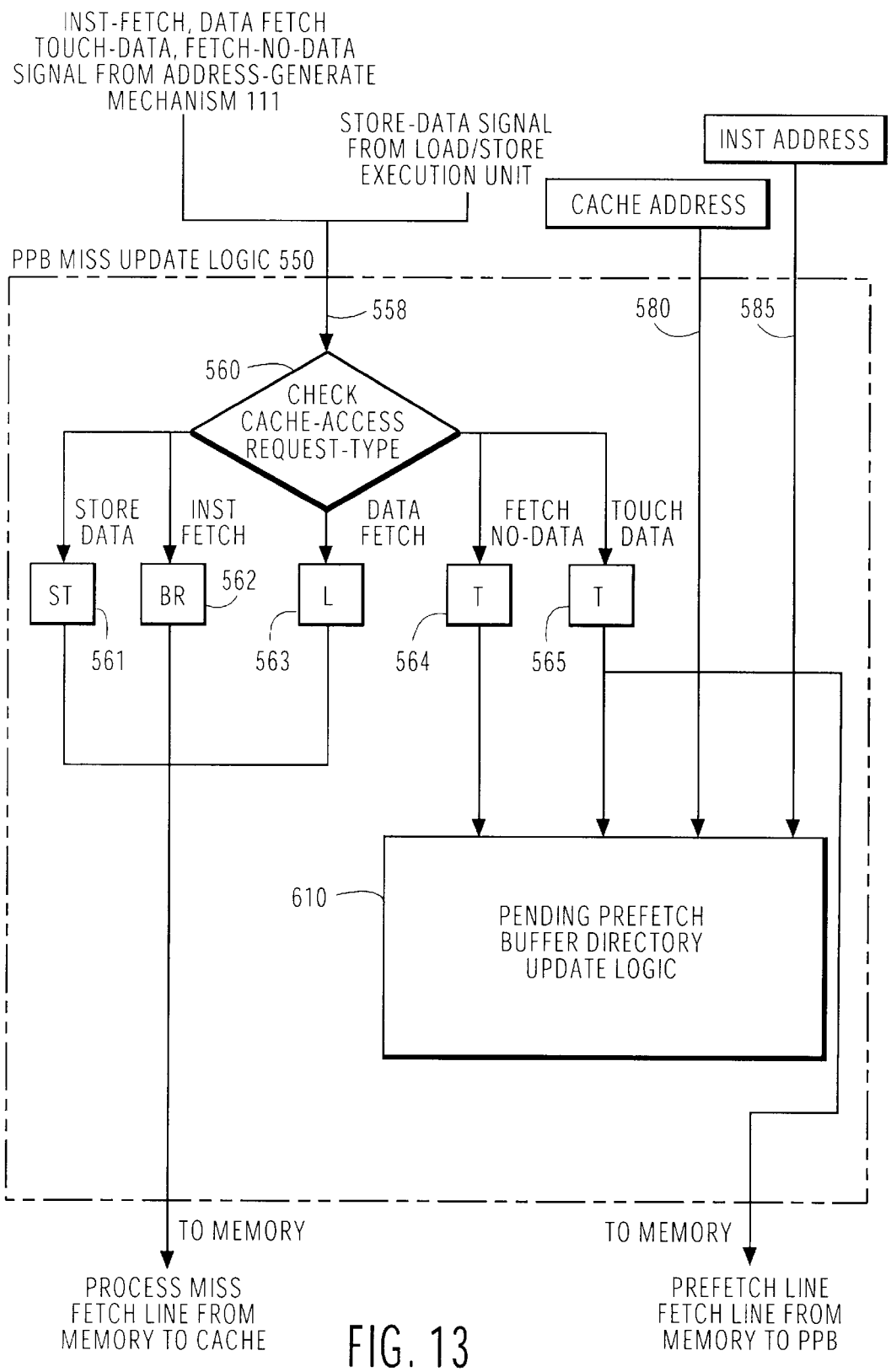
FIG. 13 is a functional block diagram of the Pending Prefetch Buffer Miss Update Logic of FIG. 12 including Pending Prefetch Buffer Directory Update Logic according to the present invention.

If gate 557 is enabled, then the cache access 401 missed the lines in the cache and missed the lines held in the PPB. When this occurs the PPB-miss-update logic 550 is enabled. FIG. 13 shows the actions of the PPB-miss-update logic and embodies the function listed in the fourth column of FIG. 11, PPB miss action. Compare logic 560 examines the cache-access-request type sent via path 558. Again there are five possible request types: instruction-fetch, data-fetch, store-data, touch-data, and fetch-no-data. If compare logic 560 detects a store-data, instruction-fetch or data-fetch then gates 561, 562 or 563 are signaled, respectively. When this occurs a cache access has missed both the cache and PPB and a miss is processed. The line is fetched from the memory to the cache. Note, that when the line returns, the line is sent to the cache, only prefetch requests returning from the memory are sent to the PPB.

Figure 14:
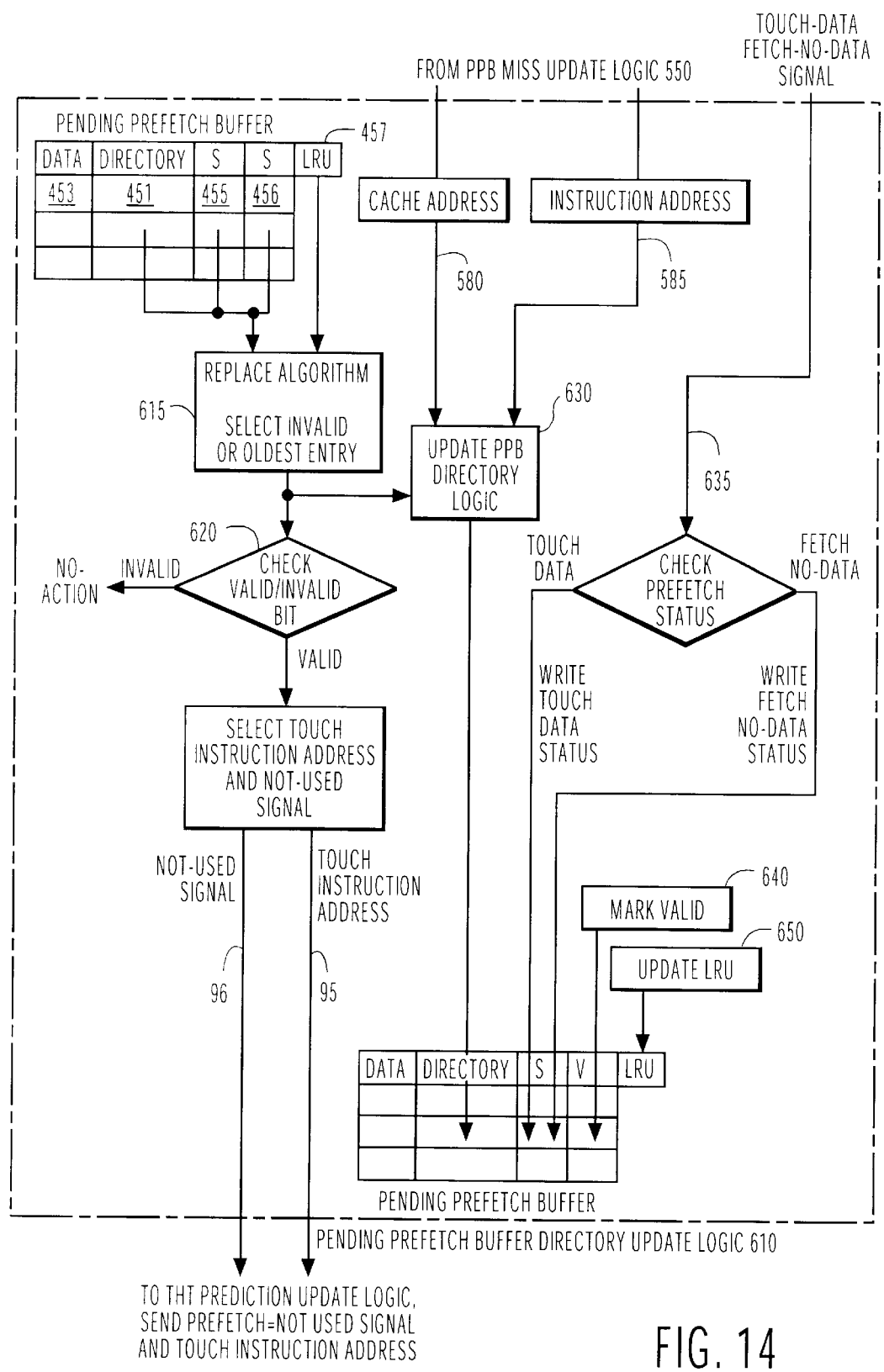
FIG. 14 is a functional block diagram of the Pending Prefetch Directory Update Logic of FIG. 13 according to the present invention.

If the cache-access-request type is a touch-data or fetch-no-data request then the pending-prefetch-buffer-directory-update logic 610 is enabled. FIG. 14 shows the actions of the pending-prefetch-buffer-directory-update logic 610 and embodies the actions shown in columns four and five for the touch-data and fetch-no-data cache-access-request types. When the pending-prefetch-buffer-directory-update logic is enabled, a PPB miss has occurred and a new directory entry must be made. If the cache-access-request type for the new directory entry is 'touch-data' then a prefetch will be made and the PPB directory will be updated to reflect the prefetch address and touch-instruction address. If the cache-access-request type for the new directory entry is 'fetch-no-data' then only the PPB directory entry is made, and no prefetch occurs.

When a new directory entry is made to the PPB the PPB-replacement-algorithm logic 615 must select an-entry for replacement. Initially the replacement algorithm will try to select any entry that has its valid bit marked invalid. If all entries in the PPB have their valid bit set to '1' then the oldest entry in the PPB is selected for replacement. The LRU field 457 of the PPB is examined to identify the oldest (least-recently-used) entry in the PPB. The replacement algorithm sends the selected information to compare logic 620, where the valid bit is examined, and the PPB-directory-update logic 630, where a new directory entry is written. The valid bit compare logic 620 examines the valid bit of the selected entry for replacement. If the valid bit is marked invalid then no action is required. In this case a line was prefetched into the PPB and transferred to the cache when it was used by the processor. If the valid bit is marked valid then the entry was not used. The THT-prediction-update logic is then signaled that the prefetch was not used. The address of the touch-instruction, from the directory portion of the PPB of the selected entry for replacement, is sent via path 95 and a not-used signal is sent via path 96.

The update-PPB-directory logic 630 updates the selected PPB directory entry with the new prefetch address and touch-instruction address that caused the prefetch. The cache access address 580 and touch instruction address 585 are supplied from the PPB miss update logic 550. These address are written into the directory portion 451 of the PPB. Compare logic 635 examines the cache-access-request type, also supplied from the PPB-miss-update logic 550. If the new entry was from a touch-data cache access then a touch-data value is written into the PPB status field of the select PPB entry. Similarly, if the new entry was created from a fetch-no-data cache-access-request then a fetch-no-data value is written in the PPB status field of the selected entry. However, regardless of the PPB status value, the valid bit is set to one, indicated a valid entry, using logic 640 and the LRU field 457 is updated, using logic 650, making it most-recently-used entry in the PPB.

Figure 15:
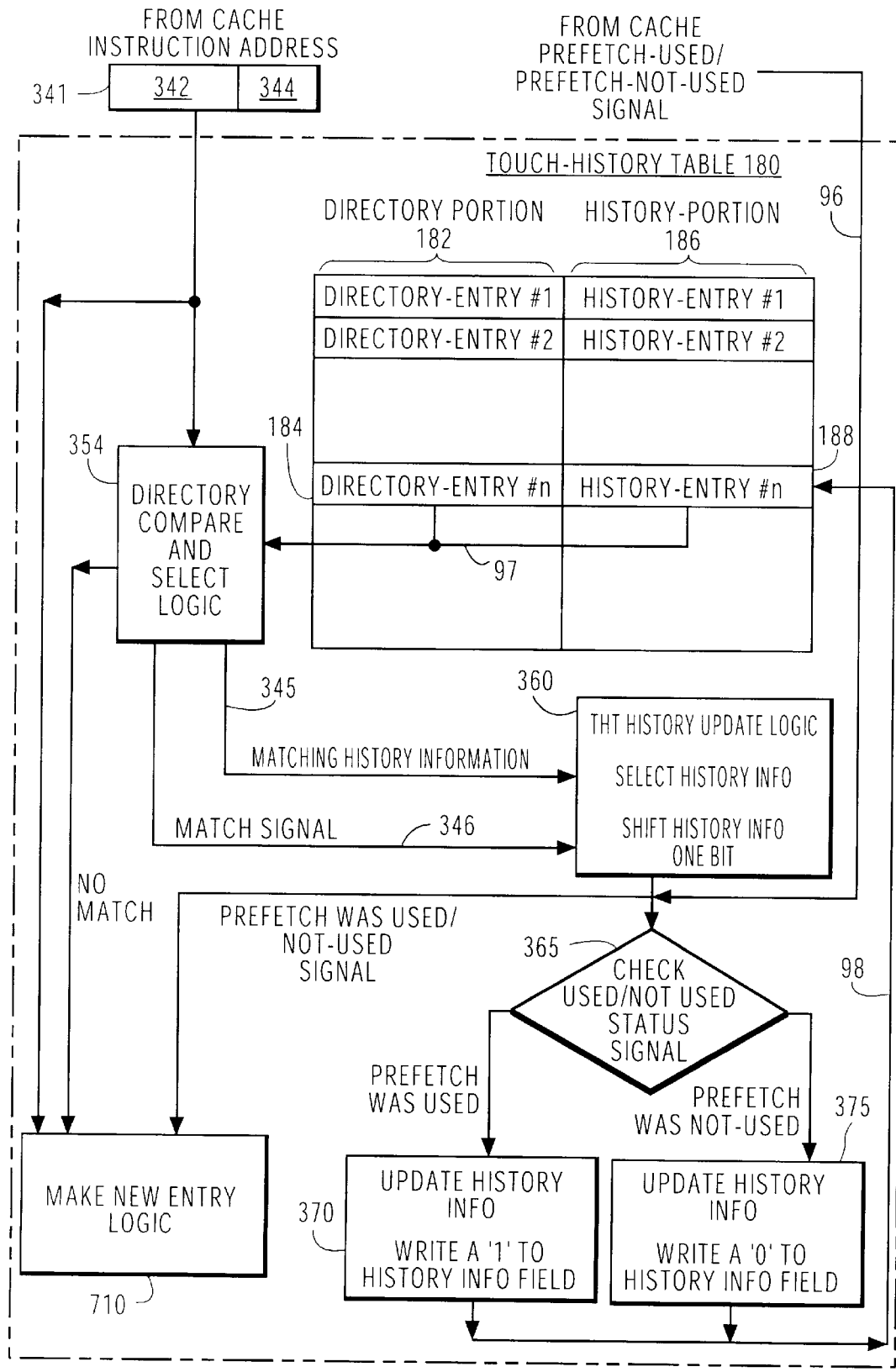
FIG. 15 is a functional block diagram of the THT Prediction Update Logic of FIG. 4 including Make New Entry Logic according to the present invention.

FIG. 15 illustrates the actions of the THT-Prediction-Update logic 350. This logic is supplied with the results of previous prefetches that were made to the PPB, either used or not used. The THT-prediction-update logic is supplied with the address of the touch instruction and a used/not-used signal from the pending-prefetch-buffer controls. Directory-compare-and-select logic 354 compares the touch-instruction address 341, sent via path 95, to the addresses saved in the directory portion of the THT, sent via path 97. If a match is found then a match signal, on path 346, and the corresponding history information of the matching entry, on path 345, are sent to the THT-history-update logic 260. If there are a multiple of history bits saved in the history field of the matching entry then the history information is shifted one position to make room for the new prefetch history information. For example, if the history field is three bits wide, recording the used/no-used status of the last three prefetched, with bit one being the most recent prefetch history and bit three being the oldest prefetch history, then bit two is shifted into bit position three and bit one is shifted into bit position two and bit one is now available to hold the most recent history information. If the history information is only a single bit wide then it will be overwritten with the new history information. Compare logic 365 examines the prefetch status (used/not-used signal) sent from the cache via path 96. If compare logic 365 detects a used signal then history-update logic 370 is enabled and a '1' is written in the most recent position of the history field. If compare logic 365 detects a not used signal then history-update logic 375 is enabled and a '0' is written in the most recent position of the history field. The information is then written back to the PPB history field via path 98.

Figure 16:
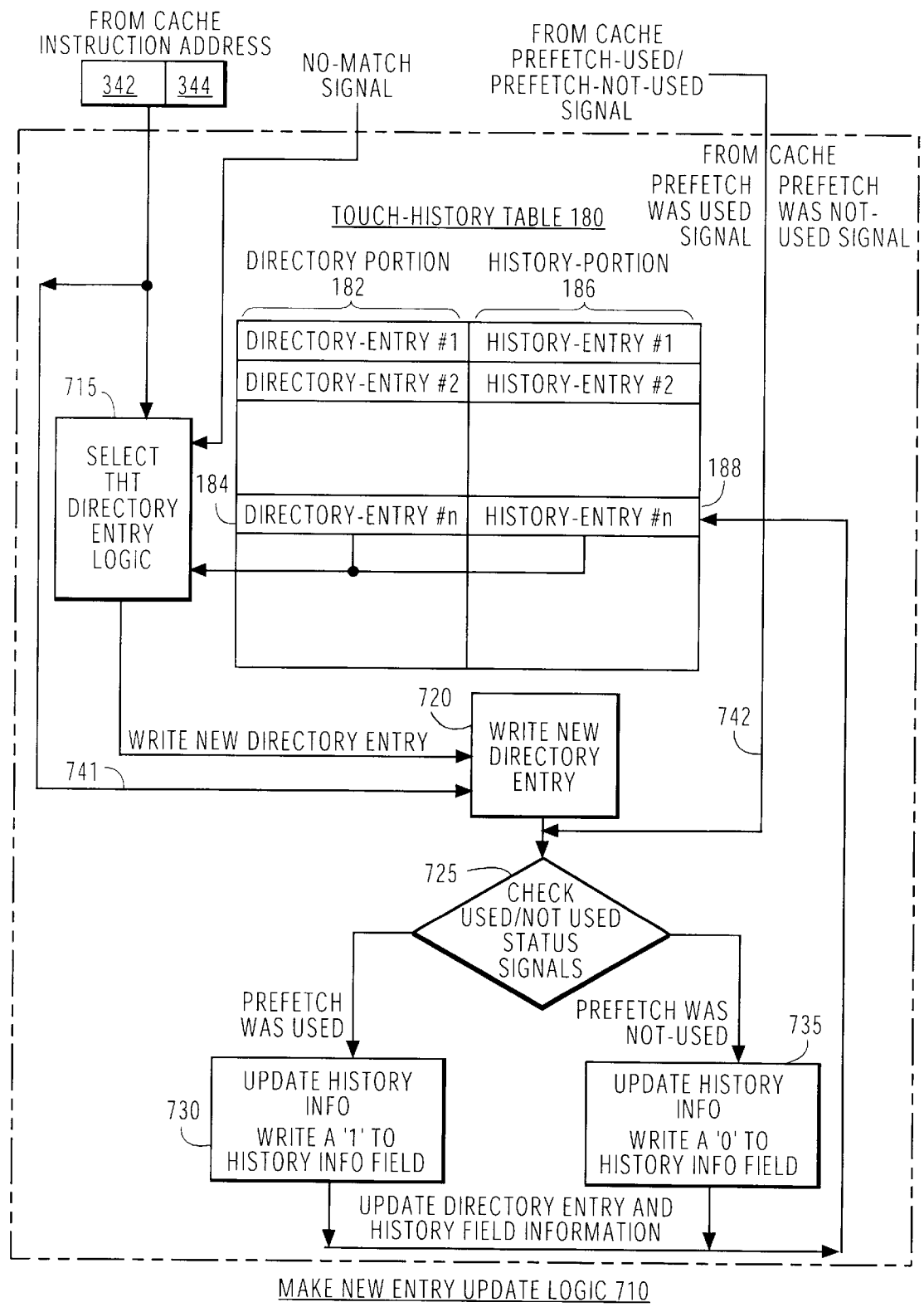
FIG. 16 is a functional block diagram of the Make New Entry Update Logic of FIG. 15 according to the present invention.

If directory-compare-and-select logic 354 does not find a match between the touch-instruction address and the entries held in the THT directory then the make-new-entry logic 710 is enabled. FIG. 16 shows the actions of the make-new-entry logic 710. This logic is enabled whenever the results of a prefetch, used or not-used, are known and no directory entry currently exists. The make-new-entry logic 710 is supplied the address of the touch instruction 341, history information denoting whether the prefetch was used or not-used, and a no-match signal that enables the select-THT-directory-entry logic 715. The no-match signal was sent from directory-compare-and-select logic 354 indicating that no directory entry was found for the touch-instruction identified by address 341. Select-THT-directory-entry logic 715 is supplied the touch-instruction address, and THT directory entries and select the oldest entry for replacement. It is noted that the figure shows the THT 180 has only one directory entry per row. In this case select logic 715 will choose the single entry for replacement. If each THT row had multiple entries then a LRU field must be added that describes the age of each entry and the oldest entry would be selected for replacement. Once the directory entry is selected for replacement then a new directory can be written. Select-THT-directory-entry logic 715 identifies the entry chosen for replacement and supplies this information to the write-new-directory-entry logic 720. The write-new-directory-entry logic 720 then updates the selected directory entry with the address of the touch-instruction 341 supplied via path 741. The appropriate history information is written by first examining the used or not-used status of the prefetch. Compare logic 725 examines the used/not-used prefetch history information supplied via path 742. If the history information denotes that the last prefetch for the touch-instruction was used then write-new-history logic 730 is signaled and a 1 is written in the most most-recent history bit for the selected THT entry. If the history information denotes that the last prefetch was not-used then write-new-history logic 735 is enabled and a 0 is written in the most-recent history bit of the selected THT entry. If the history portion of the THT contains a multiple number of history bits then write-new-history logic 730 and 735 would again write the most recent history bit denoting a used and not-used prefetch history respectively, and the remainder history bits can be initialized to denote a used or not-used conditions. This is an implementation decision and does not effect the operation of the patent described herein. Initializing the remaining history bits to 1 (denoting that the prefetch was used) will bias the initial predictions made by the THT to favor prefetching. obviously, the true history information would be recorded as successive prefetches are made by the instructions saved in the THT. Similarly, initializing the remaining history bits to 0 will bias the initial predictions made by the THT to favor no-prefetching.

Described above is a mechanism used to predict the success or failure of a prefetching instruction placed in a program. The mechanism is a preferred prediction scheme but does not indicate that alternative prediction schemes are less effective. Alternative prediction schemes are given below.

It is possible to eliminate the directory field 182 from the THT 180 entirely. The history portion of the THT 186 would then be a direct mapped array. The THT would then be accessed by selecting a subset of the bits in an instruction address to identify an history-entry (row) in the THT. A simple implementation would keep a one bit history field for each entry. Then it is possible to implement a very large THT in a relatively small amount of hardware. For example, a THT with 4K entries can be implemented as an array of 4K bits, where each bit records the history of, success or failure, of a prefetching instruction. The THT would then be accessed by selecting 12 bits from the instruction address (2**12=4096) to select an entry in the array.

In an alternate embodiment, the THT may be accessed during the instruction fetch phase of a pipeline in order predict the success or failure of a prefetch instruction. Each entry in the history portion of the THT would then identify an instruction-fetch-block that contains a prefetching instruction and associated with each entry would by the address of the prefetching instruction, contained within the instruction-fetch-block, a prefetch address, and corresponding history information. Then, when an instruction fetch is made, it would be compared against the entries saved in the THT and if a match occurs the associated prefetch address and history information could be accessed. Such an implementation would allow a prefetch and prediction to occur earlier in the pipeline and thus have a greater chance of avoiding pipeline delays caused by a cache miss.

Other embodiments of the invention will be apparent to those skilled in the art from consideration of the specification and practice of the invention disclosed herein. It is intended that the specification and examples be considered as examples only, with the true scope of the invention being indicated by the claims.

I claim:

1. In a data processing system wherein sequences of instructions stored in a main memory are executed by at least one execution unit, wherein said instructions include one or more branch instructions and one or more prefetch instructions that are different from said branch instructions, a method for executing said prefetch instructions comprising the steps of:

executing one of said prefetch instructions to provide data;

storing a success state in a history entry if said data is used by said at least one execution unit and storing a failure state in said history entry if said data is not used by said at least one execution unit, wherein said history entry is associated with said execution of said one of said prefetch instructions; and selectively executing said one of said prefetch instructions according to said stored state in said history entry corresponding to said one of said prefetch instructions.

2. The method of claim 1, wherein said history entry is a second field of an entry of a table and a first field of each entry of said table identifies a corresponding one of said prefetch instructions.

3. The method of claim 2, wherein the step executing said prefetch instructions includes the following steps:

accessing said table with an identifier related to a particular prefetch instruction to determine if said table includes a matching entry whose first field corresponds to said identifier;

reading said second field of said matching entry from said table;

performing a prefetch operation dictated by the particular prefetching instruction if said second field of said matching entry read out from said table indicates that data generated by previous execution of said one prefetch instruction has been used by said at least one execution unit.

4. The method of claim 3, wherein said prefetch operation dictated by the particular prefetching instruction is not performed if said second field of said matching entry read out from said table indicates that data generated by previous execution of said one prefetch instruction has not been used by said at least one execution unit.

5. The method of claim 3, wherein said identifier used to access said table is an instruction address of the particular prefetch instruction.

6. The method of claim 3, wherein the step of accessing said table is performed concurrently with decoding the particular prefetch instruction.

7. The method of claim 3, wherein said identifier used to access said table is an address of a block of instructions that include the particular prefetch instruction.

8. The method of claim 3, wherein the step of accessing said table is performed concurrently with fetching a block of instructions that include the particular prefetch instruction.

9. The method of claim 3, wherein said prefetch instruction identified by said first field of each of said entries is an operand prefetch instruction whereby operand data is loaded from said main memory to a high speed buffer for subsequent use by said execution unit, and wherein the second field of each of said entries indicates whether said operand data loaded from said main memory to said high speed buffer was subsequently used by said execution unit during the last N prefetch operations associated with said prefetch instruction identified by said first field of the entry.

10. The method of claim 9, wherein said prefetch operation dictated by said prefetching instruction is performed if said second field of said matching entry read out from said table indicates that said operand data loaded from said main memory to said high speed buffer was subsequently used by said execution unit during a predetermined number of the last N prefetch operations associated with said prefetch instruction.

11. The method of claim 9, wherein said prefetch operation dictated by said prefetching instruction is not performed if said second field of said matching entry read out from said table indicates that said operand data loaded from said main memory to said high speed buffer was not subsequently used by said execution unit during a predetermined number of the last N prefetch operations associated with said prefetch instruction.

12. The method of claim 9, wherein said high speed buffer includes a prefetch buffer separate from a data cache.

13. The method of claim 3, wherein said prefetch instruction identified by said first field of each of said entries is an instruction prefetch instruction whereby at least one instruction is loaded from said main memory to a high speed buffer for subsequent use by said execution unit, and wherein said second field of each of said entries indicates whether said instruction loaded from said main memory to said high speed buffer was subsequently executed by said execution unit during the last N prefetch operations associated with said prefetch instruction identified by said first field of the entry.

14. The method of claim 13, wherein said prefetch operation dictated by said prefetching instruction is performed if said second field of said matching entry read out from said table indicates that said at least one instruction loaded from said main memory to said high speed buffer was subsequently executed by said execution unit during a predetermined number of the last N prefetch operations associated with said prefetch instruction.

15. The method of claim 13, wherein said prefetch operation dictated by said prefetching instruction is not performed if said second field of said matching entry read out from said table indicates that said at least one instruction loaded from said main memory to said high speed buffer was not subsequently executed by said execution unit during a predetermined number of the last N prefetch operations associated with said prefetch instruction.

16. The method of claim 13, wherein said high speed buffer includes a prefetch buffer separate from an instruction cache.

17. The method of claim 2, further comprising the step of updating said second field of each of said entries according to results of a prefetch operation dictated by the corresponding prefetch instruction.

18. The method according to claim 1 wherein said success state is stored in said history entry if said data is used to execute one of several different types of said instructions by said at least one execution unit.

19. The method according to claim 1 wherein said execution of said one of said prefetch instructions provides said data to a memory, said success state is stored in said history entry if said data was accessed from said memory by said at least one execution unit and said failure state is stored in said history entry if said data was not accessed from said memory by said at least one execution unit.

20. A data processing system comprising:
a main memory that stores sequences of instructions to be executed by at least one execution unit, wherein said instructions include one or more branch instructions and one or more prefetch instructions that are different from said branch instructions;
a high speed buffer that stores data provided by one of said prefetch instructions;
a table of entries, each entry including a history entry storing a success state if said data is used by said at least one execution unit and storing a failure state if said data is not used by said at least one execution unit, wherein said history entry corresponds to a previous execution of said one of said prefetch instructions; and
prefetch control means for selectively executing said one of said prefetch instructions according to said stored state in said history entry corresponding to said one of said prefetch instructions.

21. The data processing system of claim 20, wherein said history entry is a second field of an entry in said table and a first field of each entry of said table identifies a corresponding one of said prefetch instructions.

22. The data processing system of claim 21, wherein said prefetch control means includes:
means for accessing said table with an identifier related to a particular prefetch instruction to determine if said table includes a matching entry whose first field corresponds to said identifier;
means for reading said second field of said matching entry from said table; and
means for performing a prefetch operation dictated by the particular prefetch instruction if said second field of said matching entry read out from said table indicates that data generated by previous execution of said one prefetch instruction has been used by said at least one execution unit.

23. The data processing system of claim 22, wherein said prefetch control means does not perform said prefetch operation dictated by the particular prefetch instruction if said second field of said matching entry read out from said table indicates that data generated by previous execution of said one prefetch instruction has not been used by said at least one execution unit.

24. The data processing system of claim 22, wherein said identifier used to access said table is an instruction address of the particular prefetch instruction.

25. The data processing system of claim 22, wherein said table is accessed concurrently with decoding the particular prefetch instruction.

26. The data processing system of claim 22, wherein said identifier used to access said table is an address of a block of instructions that include the particular prefetch instruction.

27. The data processing system of claim 22, wherein said table is accessed concurrently with fetching a block of instructions that include the particular prefetch instruction.

28. The data processing system of claim 22, wherein said prefetch instruction identified by said first field of each of said entries is an operand prefetch instruction whereby operand data is loaded from said main memory to said high speed buffer for subsequent use by said execution unit, and wherein the second field of each of said entries indicates whether said operand data loaded from said main memory to said high speed buffer was subsequently used by said execution unit during the last N prefetch operations associated with said prefetch instruction identified by said first field of the entry.

29. The data processing system of claim 28, wherein said prefetch operation dictated by said prefetching instruction is performed if said second field of said matching entry read out from said table indicates that said operand data loaded from said main memory to said high speed buffer was subsequently used by said execution unit during a predetermined number of the last N prefetch operations associated with said prefetch instruction.

30. The data processing system of claim 28, wherein said prefetch operation dictated by said prefetching instruction is not performed if said second field of said matching entry read out from said table indicates that said operand data loaded from said main memory to said high speed buffer was not subsequently used by said execution unit during a predetermined number of the last N prefetch operations associated with said prefetch instruction.

31. The data processing system of claim 28, wherein said high speed buffer includes a prefetch buffer separate from a data cache.

32. The data processing system of claim 22, wherein said prefetch instruction identified by said first field of each of said entries is an instruction prefetch instruction whereby at least one instruction is loaded from said main memory to said high speed buffer for subsequent use by said execution unit, and wherein said second field of each of said entries indicates whether said instruction loaded from said main memory to said high speed buffer was subsequently executed by said execution unit during the last N prefetch operations associated with said prefetch instruction identified by said first field of the entry.

33. The data processing system of claim 32, wherein said prefetch operation dictated by said prefetching instruction is performed if said second field of said matching entry read out from said table indicates that said at least one instruction loaded from said main memory to said high speed buffer was subsequently executed by said execution unit during a predetermined number of the last N prefetch operations associated with said prefetch instruction.

34. The data processing system of claim 32, wherein said prefetch operation dictated by said prefetching instruction is not performed if said second field of said matching entry read out from said table indicates that said at least one instruction loaded from said main memory to said high speed buffer was not subsequently executed by said execution unit during a predetermined number of the last N prefetch operations associated with said prefetch instruction.

35. The data processing system of claim 32, wherein said high speed buffer includes a prefetch buffer separate from an instruction cache.

36. The data processing system of claim 21, further comprising update logic means for updating said second field of each of said entries according to results of a prefetch operation dictated by the corresponding prefetch instruction.

37. The data processing system of claim 20, wherein said success state is stored in said history entry if said data is used to execute one of several different types of said instructions by said at least one execution unit.

38. The data processing system of claim 20, wherein said one of said prefetch instructions provides said data to the high speed buffer, said success state is stored in said history entry if said data was accessed from said high speed buffer by said at least one execution unit and said failure state is stored in said history entry if said data was not accessed from said high speed buffer by said at least one execution unit.

* * * * *